(12) United States Patent
Kawahara et al.

(10) Patent No.: US 10,732,786 B2
(45) Date of Patent: Aug. 4, 2020

(54) TERMINAL DEVICE AND DISPLAY CONTROL METHOD

(71) Applicant: FUJITSU CLIENT COMPUTING LIMITED, Kawasaki-Shi, Kanagawa (JP)

(72) Inventors: Masanori Kawahara, Kawasaki (JP); Makoto Suzuki, Kawasaki (JP); Yukihiro Abiko, Kawasaki (JP); Satoshi Semba, Kawasaki (JP); Rie Hasada, Kawasaki (JP)

(73) Assignee: FUJITSU CLIENT COMPUTING LIMITED (JP)

( * ) Notice: Subject to any disclaimer, the term of this patent is extended or adjusted under 35 U.S.C. 154(b) by 0 days.

(21) Appl. No.: 16/444,210

(22) Filed: Jun. 18, 2019

(65) Prior Publication Data

US 2019/0303696 A1    Oct. 3, 2019

Related U.S. Application Data

(63) Continuation of application No. PCT/JP2018/000958, filed on Jan. 16, 2018.

(30) Foreign Application Priority Data

Jan. 19, 2017  (JP) .................. 2017-007707

(51) Int. Cl.
*G06F 3/0481*  (2013.01)
*G06F 3/0488*  (2013.01)
(Continued)

(52) U.S. Cl.
CPC .............. *G06F 3/0481* (2013.01); *G06F 3/01* (2013.01); *G06F 3/0488* (2013.01);
(Continued)

(58) Field of Classification Search
CPC ........ G06F 3/0481; G06F 3/048; G06F 21/32; G06F 21/31; G06F 3/041; G06F 3/0488;
(Continued)

(56) References Cited

U.S. PATENT DOCUMENTS

2013/0038546 A1   2/2013  Mineo
2016/0328597 A1  11/2016  Abiko et al.

FOREIGN PATENT DOCUMENTS

| JP | 2013-037556 A | 2/2013 |
| JP | 2014-016248 A | 1/2014 |
| JP | 2016-212636 A | 12/2016 |

OTHER PUBLICATIONS

International Search Report for Patent Application No. PCT/JP2018/000958 dated Mar. 6, 2018 (2 pages) with English translation.
(Continued)

*Primary Examiner* — Sanjiv D. Patel
(74) *Attorney, Agent, or Firm* — Harness, Dickey & Pierce, P.L.C.

(57) ABSTRACT

A terminal device is provided that has a position determination unit that, when authentication images that capture biological information are to be obtained, determines the position of the next touch location to be displayed in a guide display for touch locations that represent a read operation for the biological information. The determination is made from: the refresh rate of a display that displays the guide display; the number of authentication images to be acquired; and the distance at which the guide display is updated.

9 Claims, 19 Drawing Sheets

(51) Int. Cl.
*G06F 21/32* (2013.01)
*G06K 9/00* (2006.01)
*H04N 5/225* (2006.01)
*G06F 3/01* (2006.01)
*G09G 5/38* (2006.01)
*G09G 5/00* (2006.01)
*G06T 1/00* (2006.01)

(52) U.S. Cl.
CPC .......... *G06F 3/04886* (2013.01); *G06F 21/32* (2013.01); *G06K 9/00087* (2013.01); *G06K 9/00912* (2013.01); *G06T 1/00* (2013.01); *G09G 5/00* (2013.01); *G09G 5/38* (2013.01); *H04N 5/225* (2013.01)

(58) Field of Classification Search
CPC ...... G06F 3/04886; G06F 3/017; G06F 21/30; G06F 3/0416; G06F 2203/04808; G06F 2203/0338; G06F 2203/04104; G06K 9/00087; G06K 9/00013; G06K 9/00912; G06K 9/00026; G06K 9/00033; G06K 2009/00932; G06K 9/00067; G06K 9/00355; G06K 9/00006; G06K 9/00885; G06K 2009/00395; G06K 9/00255; G06K 9/00382; G06K 9/00892; G06K 9/00926; G06K 9/3233; G06K 2009/0006; G06K 9/0002; G06K 9/0004; G06K 9/00288; G06K 9/00604; G06K 9/00899; G06K 9/03

See application file for complete search history.

(56) References Cited

OTHER PUBLICATIONS

J. Johnson, "Designing With the Mind in Mind", Second Edition, p. 156, 2014.

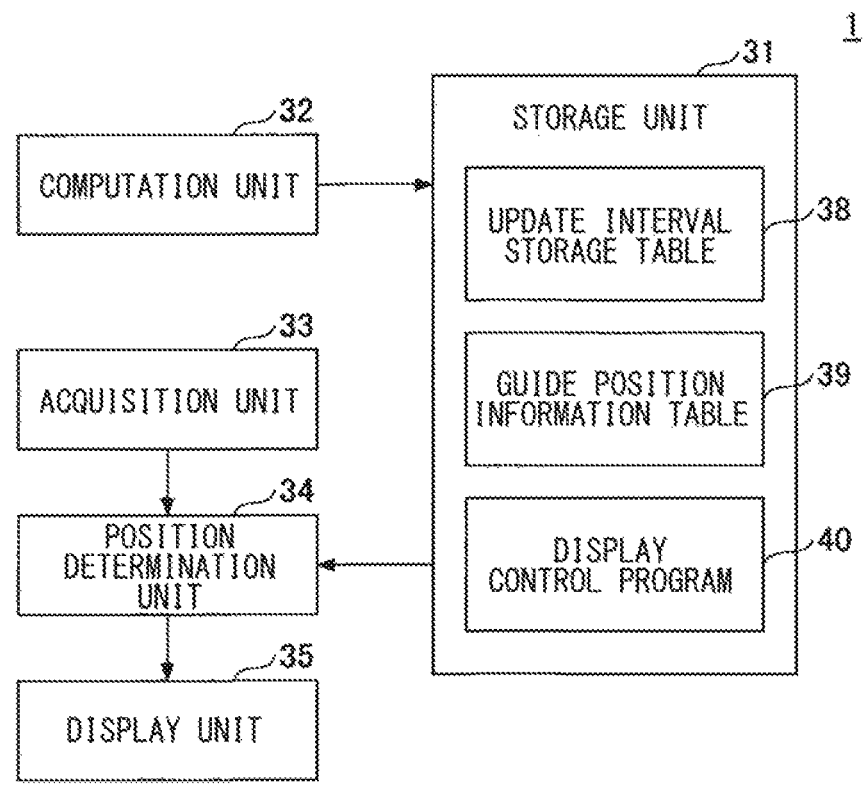

FIG. 16
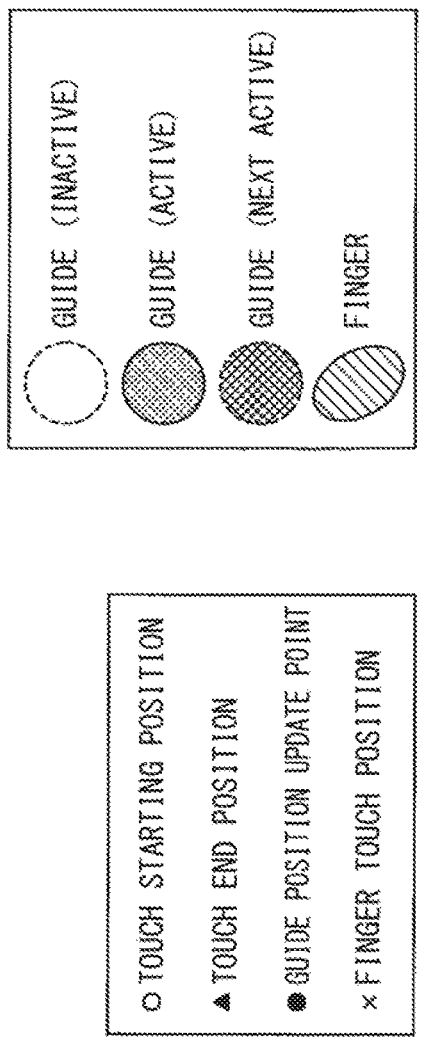
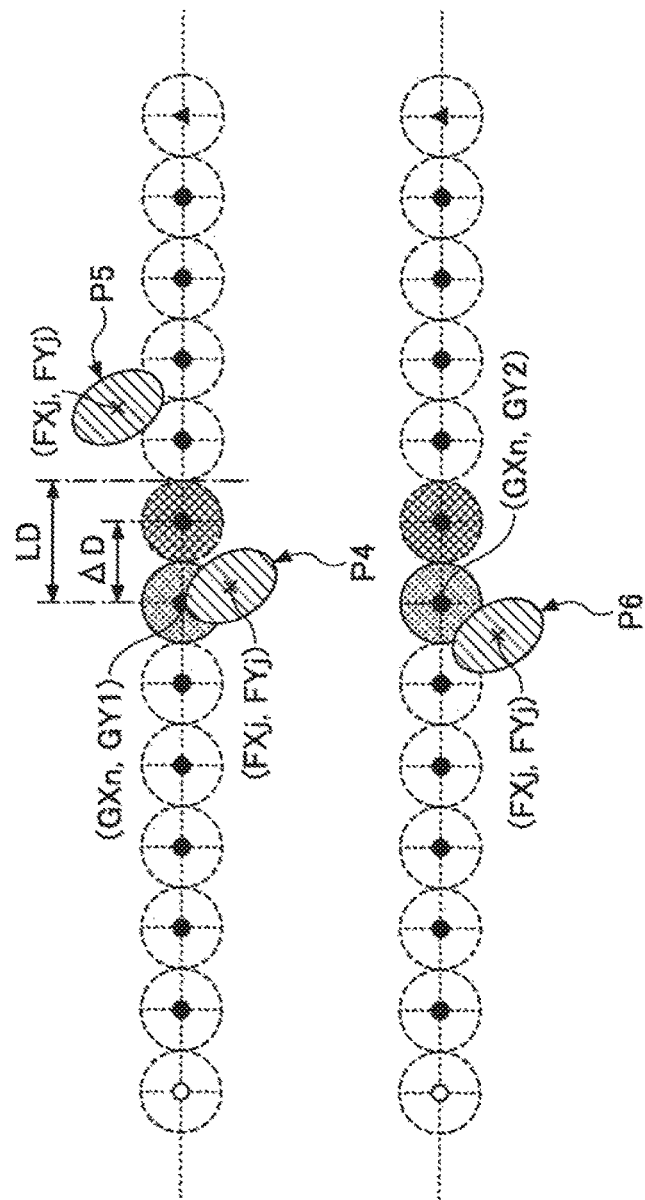

FIG. 17
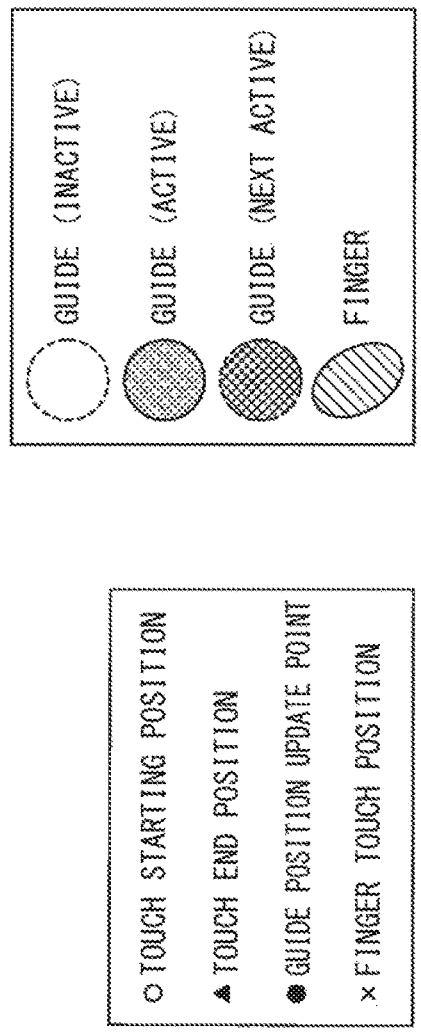
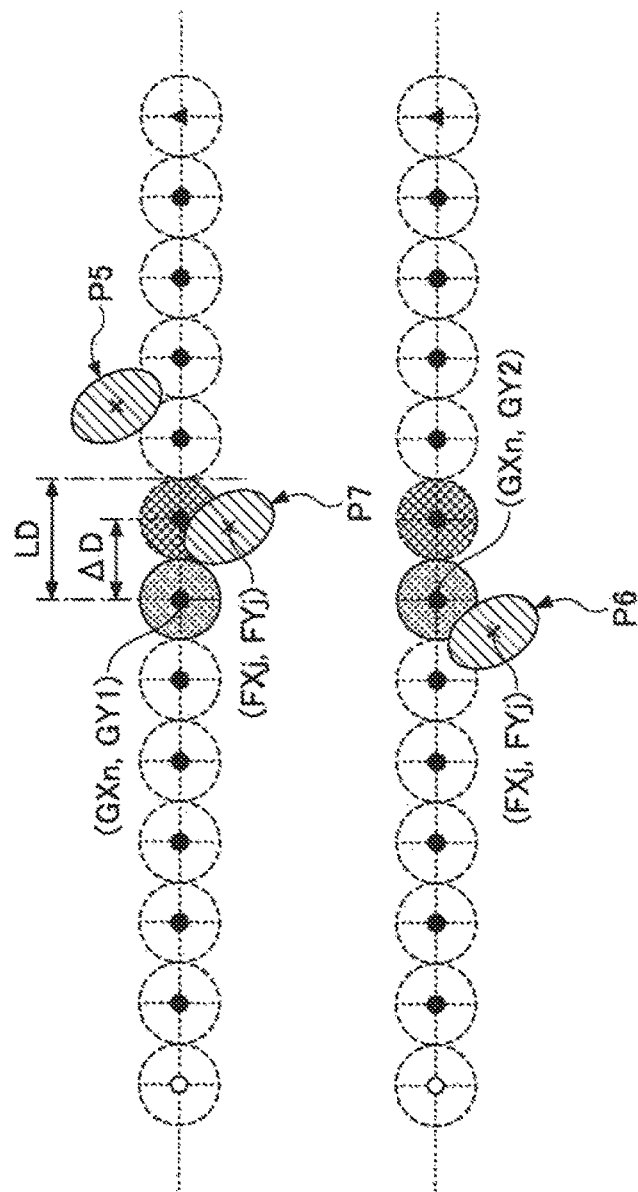

FIG. 18
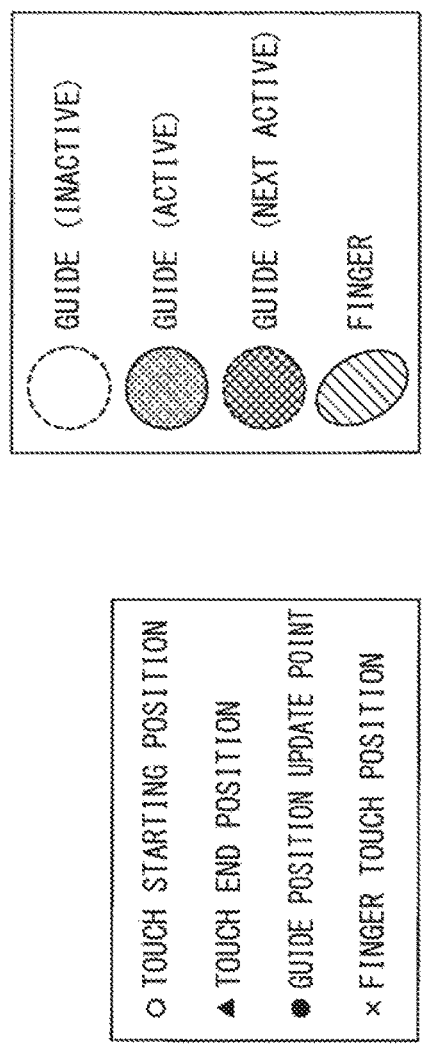
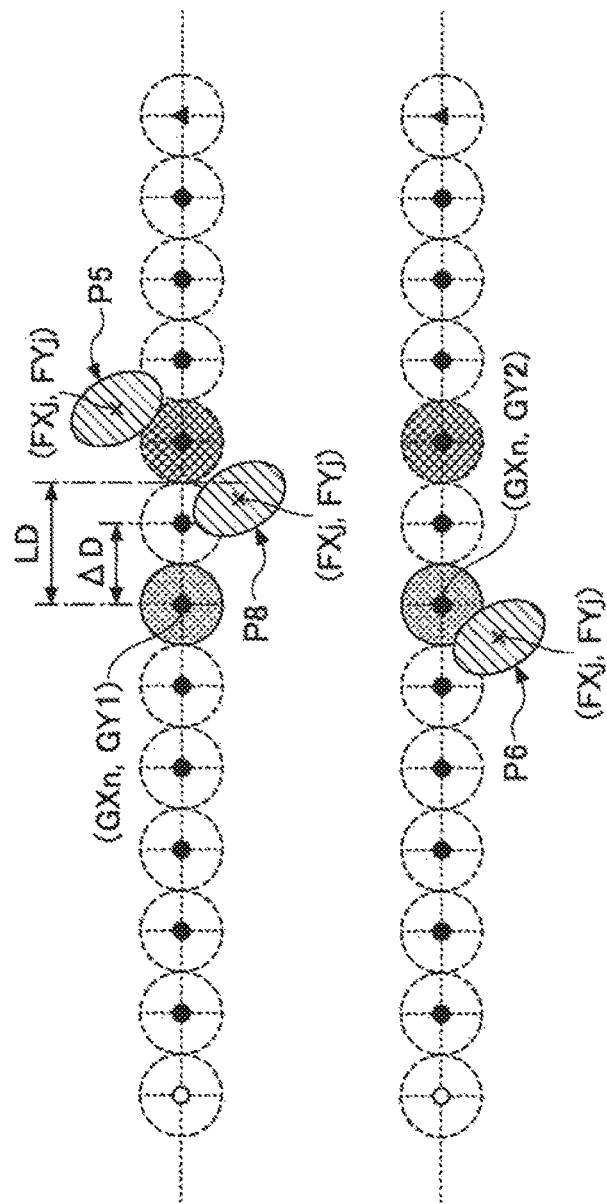

TERMINAL DEVICE AND DISPLAY CONTROL METHOD

The present invention relates to a terminal device and a display control method.

This application is a continuation application of PCT International Application No. PCT/JP2018/000958, filed on Jan. 16, 2018, which claims priority from Japanese Patent Application No. 2017-007707, filed on Jan. 19, 2017. The entire content of both the above PCT International Application and the above Japanese Application are incorporated herein by reference.

FIELD OF THE INVENTION

Description of Related Art

Among portable terminals such as tablet terminals and the like, there are devices that are equipped with a biometric authentication function (see, for example, Japanese Unexamined Patent Application, First Publication No. 2014-016248). Japanese Unexamined Patent Application, First Publication No. 2014-016248 discloses a terminal device in which, instead of having a camera that can read biometric information at once, a line scan camera is provided on a lateral side of a display, and the palm of the hand is moved over the line scan camera to read the biometric information. As a result thereof, space is saved.

In Japanese Unexamined Patent Application, First Publication No. 2014-016248, in order to reduce biometric information reading errors when moving the palm of the hand, touch areas are presented as guides on a display, and the fingers are moved in accordance with the touch areas, thereby causing the palm of the hand to pass over the line scan camera and allowing biometric information to be acquired from the palm of the hand.

The time required to acquire the biometric information images necessary for authentication should preferably be short. Additionally, if the distance between the previous display position and the next display position of the touch areas indicating the positions at which the fingers are to be placed is too large, then the guide display will appear to jump, so the touch areas should preferably be presented at intervals such that the guide display appears to move smoothly.

However, if the speed at which the palm of the hand passes over the camera is too fast, then in some cases, the required number of images may not be able to be captured with the precision necessary for biometric authentication, depending on the time interval necessary for a camera to capture one image and then to capture the next image. Additionally, if the time interval by which the display of the positions of the touch areas is updated is made shorter, then the load on the system becomes greater, and the screen may appear to flicker or the camera image acquisition may fail.

For this reason, simply moving the positions of the touch areas faster and moving the hand or the fingers faster in accordance with the guide display can cause the screen to flicker and not allow the required number of images to be acquired with the precision necessary for biometric authentication, so that the time required for acquiring the captured images necessary for authentication is not shortened.

SUMMARY OF THE INVENTION

Therefore, according to one aspect, a purpose of the present invention is to prevent flickering of a guide display when obtaining images in which biometric information is captured for the purpose of authentication.

In one embodiment, the present invention provides a terminal device comprising a position determination unit that, when obtaining authentication images in which biometric information is captured, determines a position of a touch area to be presented next, in a guide display of touch areas indicating a biometric information reading operation, based on a refresh rate of a display providing the guide display, a number of authentication images to be acquired and a distance over which the guide display is to be updated.

BRIEF DESCRIPTION OF THE DRAWINGS

FIG. 6 is a diagram illustrating an example of the functional structure of a terminal device according to one embodiment.

FIG. 7 is a diagram illustrating an example of a guide position information table according to one embodiment.

FIG. 16 is a diagram illustrating an example in which guide updating conditions are established in update process 2 according to one embodiment.

FIG. 17 is a diagram illustrating an example in which guide updating conditions are established in update process 2 according to one embodiment.

FIG. 18 is a diagram illustrating an example in which guide updating conditions (jumping) are established in update process 2 according to one embodiment.

BRIEF DESCRIPTION OF THE INVENTION

Hereinafter, embodiments of the present invention will be explained with reference to the attached drawings. In the present specification and drawings, structural elements having substantially the same functional structure will be indicated by appending the same reference signs, thereby eliminating redundant explanations.

Biometric Authentication

In biometric authentication, personal verification is performed by using characteristic biometric information that is different in each individual, such as fingerprints, the face, the palms of the hands, the irises and veins. For example, in palm authentication, biometric authentication is performed by using biometric information such as handprints, hand shapes and veins in the palms. In the following explanation, an example of palm authentication in a terminal device equipped with a biometric authentication function, such as a tablet terminal, will be explained, but the biometric authentication need not be limited to palm authentication.

The terminal device according to one embodiment of the present invention may have a biometric information reading device and a biometric authentication device installed therein. The biometric information reading device may be included in the biometric authentication device.

Terminal devices include PCs (personal computers), tablet terminals, smartphones and portable terminals. In the examples indicated below, the terminal device 1 is a portable terminal such as a tablet terminal or a smartphone.

Guidance Screen

Figure 1:
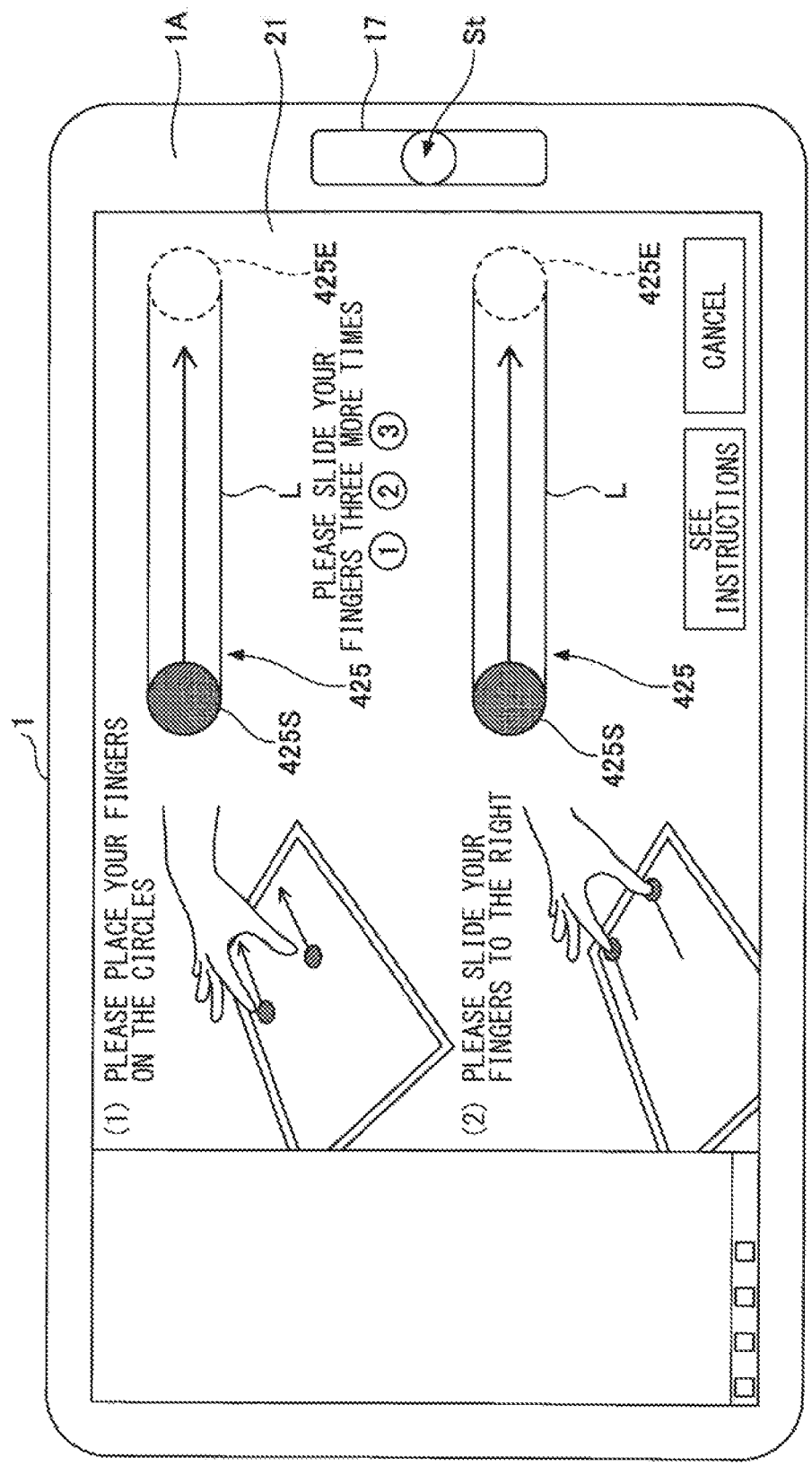
FIG. 1 is a diagram illustrating an example of a guidance screen of a terminal device according to one embodiment.

First, an example of a guidance screen in the terminal device 1 according to the present embodiment will be explained with reference to FIG. 1. The terminal device 1 that is equipped with a biometric authentication function captures an image of a living body by means of, for example, a camera 17 provided in a housing 1A. In this example, in the terminal device 1, an internal display 21 having a touch panel laminated thereon is provided on the upper surface of a housing 1A having a substantially rectangular shape in plan view, and a camera 17 is provided at a position at the center of a lateral side of the housing 1A surrounding the internal display 21. However, the position of the camera 17 is not limited thereto, and it may be provided at any position on the housing 1A. In the terminal device 1, space is saved by moving the palm of the hand over the camera 17 to read biometric information.

In order to reduce biometric information reading errors when moving the palm of the hand, finger touch areas 425 are presented on the internal display 21. The touch areas 425 that are presented on the internal display 21 include circular starting guide buttons 425S indicating starting points (hereinafter also referred to as "starting position points") at which the fingers are to be placed, and circular end guide buttons 425E indicating end points (hereinafter also referred to as "end position points") at which the fingers are to be placed. Additionally, the display of the touch areas 425 includes guide lines L over which the fingers are to be slid from the starting guide buttons 425S to the end guide buttons 425E, and arrows indicating the directions in which the fingers are to be slid. In the presented example, by moving two fingers from the starting guide buttons 425S to the end guide buttons 425E in accordance with the two touch areas 425, the palm of the hand is made to pass over the camera 17, allowing palm biometric information to be acquired.

Reading Operation Using Guidance Screen

Figure 2:
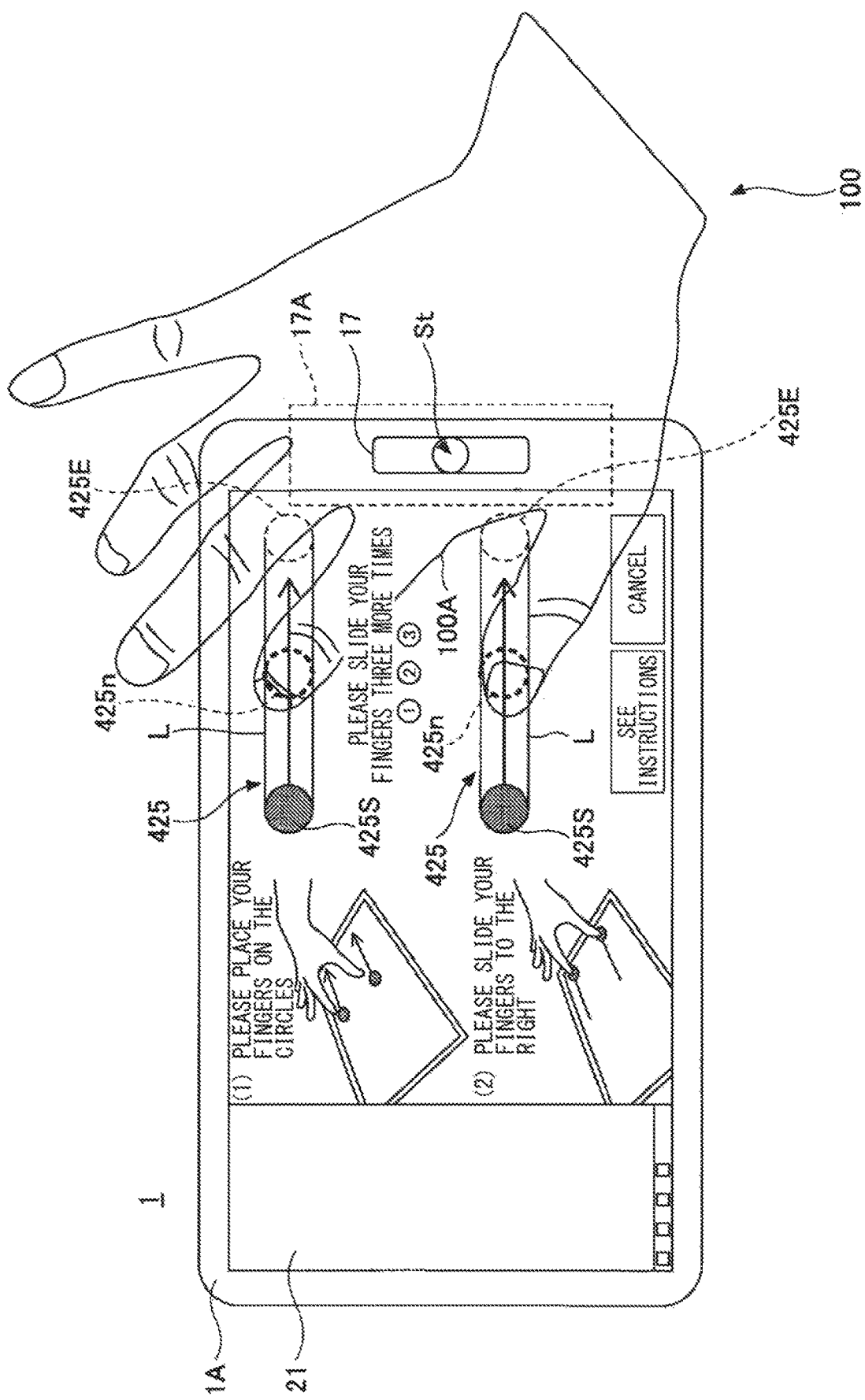
FIG. 2 is a diagram for explaining a reading operation using a guidance screen according to one embodiment.

FIG. 2 illustrates an example of a reading operation using a guidance screen according to one embodiment. In the example illustrated in FIG. 2, two touch areas 425, in each of which a starting guide button 425S, a guide button 425n and an end guide button 425E are shown on a guide line L, are presented on an internal display 21.

As shown in FIG. 2, a user 100 simultaneously swipes the tips of the fingers (in this example, the thumb and the index finger) across the two touch areas 425. During that time, the camera 17 captures images of the palm 100A within an imaging range 17A.

When the user 100 performs the operation to simultaneously touch and slide multiple fingertips across the touch areas 425, the angle of the palm 100A with respect to the internal display 21 remains stable and does not largely change while the multiple fingertips are simultaneously sliding over the internal display 21. For this reason, it is possible to reduce relative angular deviation between the terminal device 1 and the hand of the user 100, thereby allowing the palm 100A to be stably imaged by the camera 17.

In FIG. 2, the two guide lines L of the touch areas 425 are presented so as to each be continuous on the internal display 21, but they may be presented in dashed form. Additionally, the guide lines L do not need to be presented.

In this example, a starting guide button 425S indicating the touch starting position, a guide line L and an end guide button 425E indicating the touch end position are presented for each touch area 425. At this time, it is possible to present the guide line L, the starting guide button 425S, the guide button 425n and the end guide button 425E differently for a touch area 425 in which the operation has been completed and a touch area 425 in which the operation has not been completed, by changing the darkness or lightness of the colors or the types of lines.

The guide buttons 425n guide the fingers to touch areas that are to be touched next, based on the positions touched by the fingers between the starting guide buttons 425S and the end guide buttons 425E. The arrows indicate the movement direction. The guide buttons 425n may be presented with dark hatching.

Figure 3:
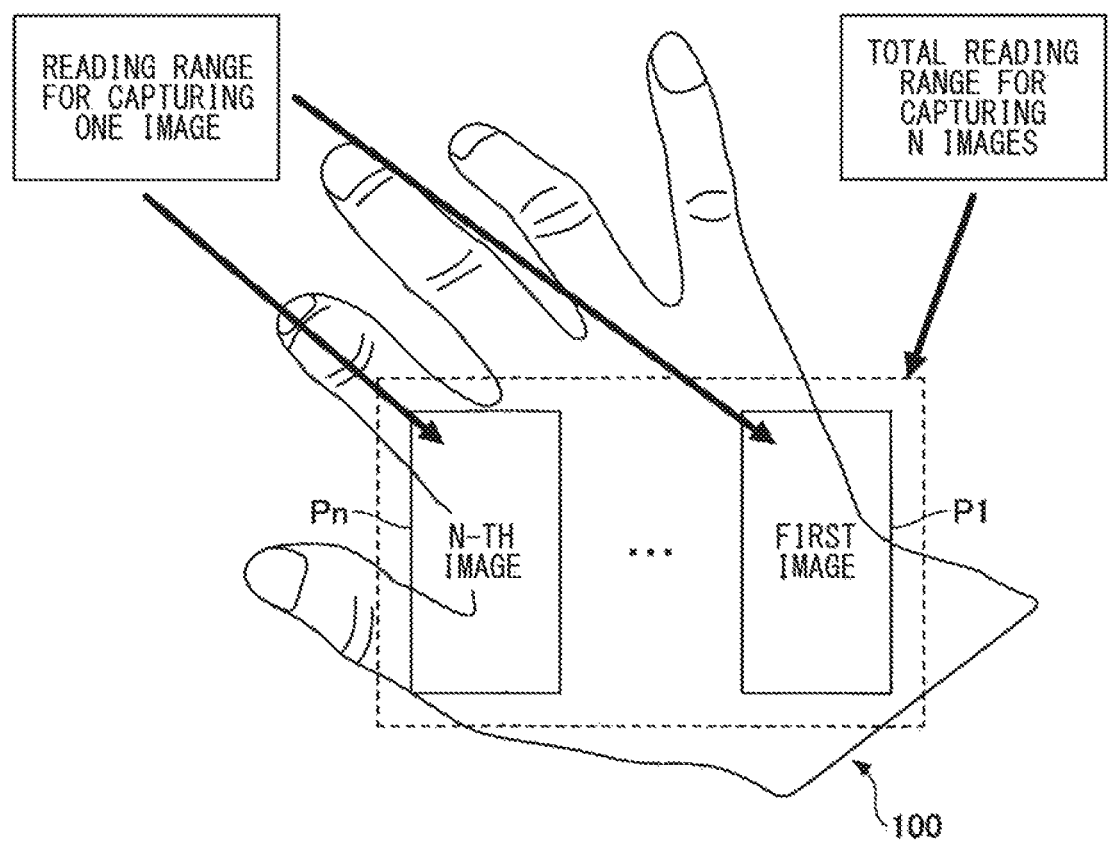
FIG. 3 is a diagram for explaining a reading range for a reading operation according to one embodiment.

FIG. 3 illustrates an example of palm image acquisition. By prompting a user to touch the fingers at the touch areas in the guide display and move the fingers in accordance with the guide display of the guide buttons 425n, the palm passes through the imaging range of the camera 17. The camera 17 captures images of the palm as it passes in accordance with the guide display. The camera 17 captures the required number or more of images with the precision necessary for authentication. As a result thereof, a first image P1 to an N-th image Pn, in which biometric information is captured, are obtained in accordance with the reading range for capturing one image, and images of the total reading range for N captures are obtained.

Updating of Guide Buttons

Figure 4:
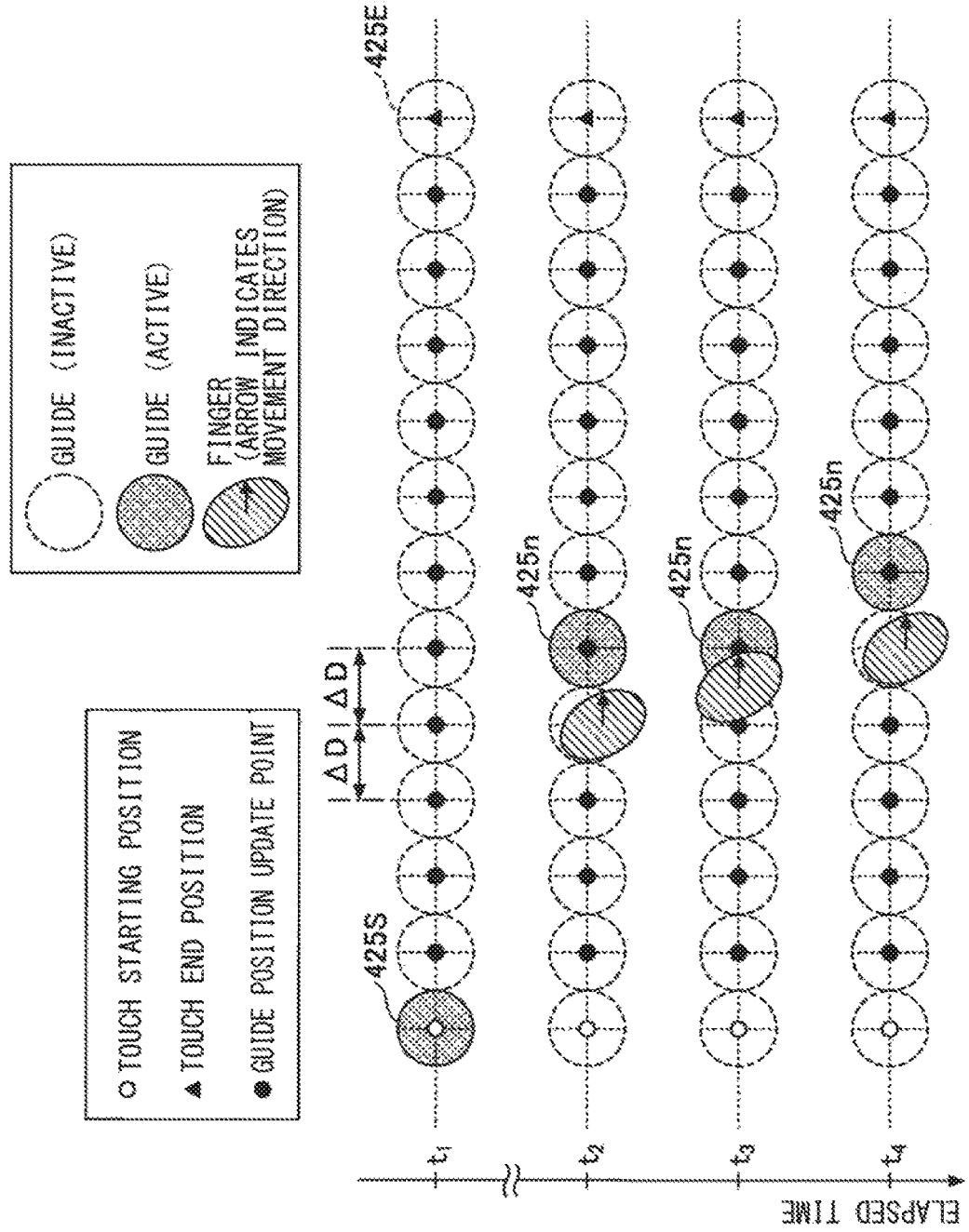
FIG. 4 is a diagram illustrating an example of the updating of a guide button according to one embodiment.

FIG. 4 illustrates an example of the updating of a guide button according to one embodiment. In a guide display, guide position update points (hereinafter also referred to as "update points") are set at equidistant intervals between the touch starting position and the touch end position. A starting guide button 425S is presented at the touch starting position, an end guide button 425E is presented at the touch end position and a guide button 425n is presented at a guide position update point. The guide button 425n is presented so that, when a finger arrives at a guide position update point, the guide button 425n display position is updated so as to be ahead of the finger in the advancement direction thereof. The guide position update points are an example of the touch areas 425. In the present embodiment, the interval $\Delta D$ between update points is precomputed to be a distance such that screen flickering is prevented and the required number of images can be acquired with the precision necessary for authentication.

First, at a time $t_1$ before a finger touches the guide display screen, a starting guide button 425S is presented at the touch starting position. At this time, for example, the starting guide button 425S may be presented in red at the touch starting position, and the end guide button 425E may be presented in gray at the touch end position.

When the starting guide button 425S is touched by a finger, the display position of the guide button 425n is updated so as to be ahead of the finger in the advancement direction thereof. At this time, for example, a guide button 425n next to the starting guide button 425S may be presented in red and the starting guide button 425S may be presented in gray or not presented. Between the starting guide button 425S and the end guide button 425E, the guide button 425n is presented at active guide position update points, and the guide button 425n is not displayed at inactive guide position update points.

More specifically, as the finger moves, the display position of the guide button 425n is updated so as to be ahead of the finger in the advancement direction thereof. For example, in FIG. 4, the finger has not arrived at the guide button 425n presented at the guide position update point that is active at time $t_2$, but the finger arrives at that guide button 425n at time t3. When the finger arrives at a guide position update point, the display position of the guide button 425n is updated so as to be ahead of the finger in the advancement direction thereof. In this way, when the guide position update point to which the finger should move next changes from inactive to active, the guide button 425n is presented at the point that became active.

Hardware Structure

Figure 5:
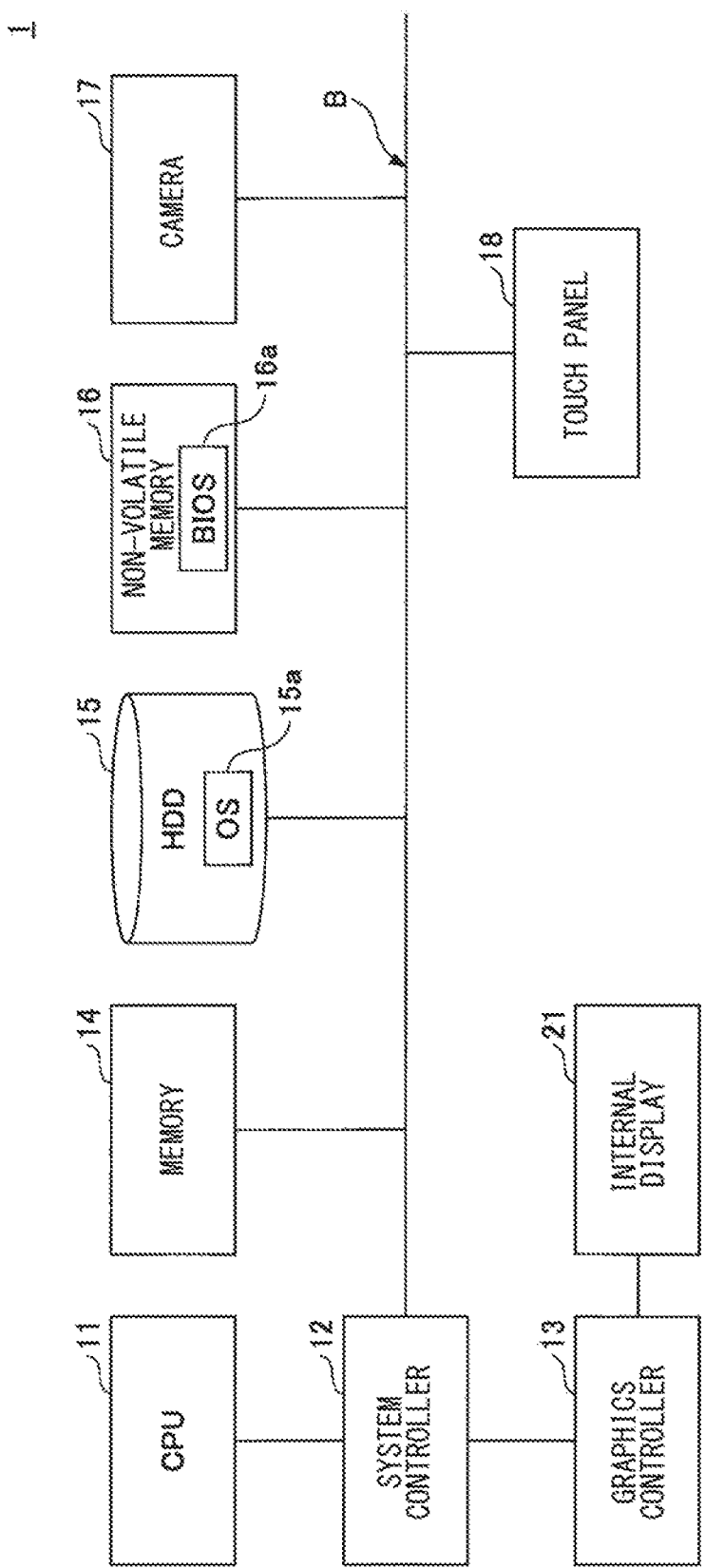
FIG. 5 is a diagram illustrating an example of the hardware structure of a terminal device according to one embodiment.

First, an example of the hardware structure of the terminal device 1 according to the present embodiment will be explained with reference to FIG. 5. The terminal device 1 has a CPU (Central Processing Unit) 11, a system controller 12, a graphics controller 13, a memory 14, an HDD (Hard Disk Drive) 15, a non-volatile memory 16, a camera 17, a touch panel 18 and an internal display 21.

If the terminal device 1 has a communication function, it may further have a well-known communication interface for transmitting and receiving signals. Additionally, if the terminal device 1 has the function of connecting to an external network such as the internet, it may further have a well-known external interface.

The system controller 12 controls the entire terminal device 1. The system controller 12 is connected to a CPU 11. Additionally, the system controller 12 is connected, via a bus B, to the graphics controller 13, the memory 14, the HDD 15, the non-volatile memory 16, the camera 17, the touch panel 18 and the internal display 21. Furthermore, an expansion slot such as, for example, a PCI Express slot or a PCI slot, may be connected to the bus B.

The CPU 11 can run computer programs, including an authentication processing program, to implement various functions of the terminal device 1 including biometric authentication. Additionally, the CPU 11 can run a display control program to implement a function for controlling the display positions of the touch areas 425.

The graphics controller 13 controls the internal display 21 in accordance with instructions from the CPU 11 via the system controller 12, and presents various screens, such as presenting the touch areas 425.

The memory 14 may store computer programs, including an authentication processing program and a display control program, to be run by the CPU 11, and various types of data. The memory 14 may comprise, for example, an SDRAM (Synchronous Dynamic Random Access Memory). The memory 14 is an example of a storage unit.

The HDD 15 stores various programs and various types of data. An OS 15a is contained in the HDD 15. Additionally, an application for controlling the display of the touch areas 425 is installed in the HDD 15.

A BIOS (Basic Input/Output System) 16a is contained in the non-volatile memory 16. The BIOS 16a runs a POST (Power-On Self Test, a self-diagnosis test) when a power supply of the terminal device 1 is turned on. The non-volatile memory 16 may comprise, for example, an EEPROM (Electrically Erasable Programmable Read-Only Memory).

The camera 17 captures images of the palm of the hand as it moves above the camera 17 when the user touches the touch areas 425 on the internal display 21 and performs finger operations in accordance with guides in the touch areas 425. The touch panel 18 is laminated onto the internal display 21 and detects the coordinates of positions touched by the user's fingers.

The camera 17 is an example of a biometric information reading device. The biometric information reading device may be formed from a camera 17 that captures images of, for example, a palm print, a hand shape, the face or the like. Additionally, the biometric information reading device may be formed from a near-infrared sensor (or near-infrared camera) including an image sensor (or camera), having sensitivity in the near-infrared wavelength region, for capturing images of, for example, the veins on the palm, the veins on the fingers, the irises or the like, and a near-infrared illumination light source. Additionally, the biometric information reading device may include both a camera having sensitivity in a wavelength region other than the near-infrared wavelength region, and a near-infrared sensor.

In addition to symbols, diagrams, messages and the like, the internal display 21 presents touch areas 425 and the like, including touch position starting points and end points indicating user finger operation positions, user finger movement directions and touch position movement instructions.

Functional Structure

Next, an example of the functional structure of the terminal device 1 according to the present embodiment will be explained with reference to FIG. 6. The terminal device 1 has a storage unit 31, a computation unit 32, an acquisition unit 33, a position determination unit 34 and a display unit 35.

The storage unit 31 has an update interval storage table 38 and a guide position information table 39. The update interval storage table 38 stores the interval between update points that was precomputed by considering the conditions of computational factors. The conditions of computational factors are conditions for preventing screen flickering and acquiring the required number of images with the precision necessary for authentication. The computation of the update point interval will be explained below.

An example of a guide position information table 39 is shown in FIG. 7. The guide position information table 39 stores an upper guide line Y coordinate GY1 and a lower guide line Y coordinate GY2. Additionally, the guide position information table 39 stores information including the update point X array position (1) GX(1), the update point X array positions (i) (i=2, 3, . . . , N−1) GXi, the update point X array position (N) GXN and the diameter GRP of the guide buttons. The guide position information table 39 is stored, for example, in the HDD 15.

Figure 8:
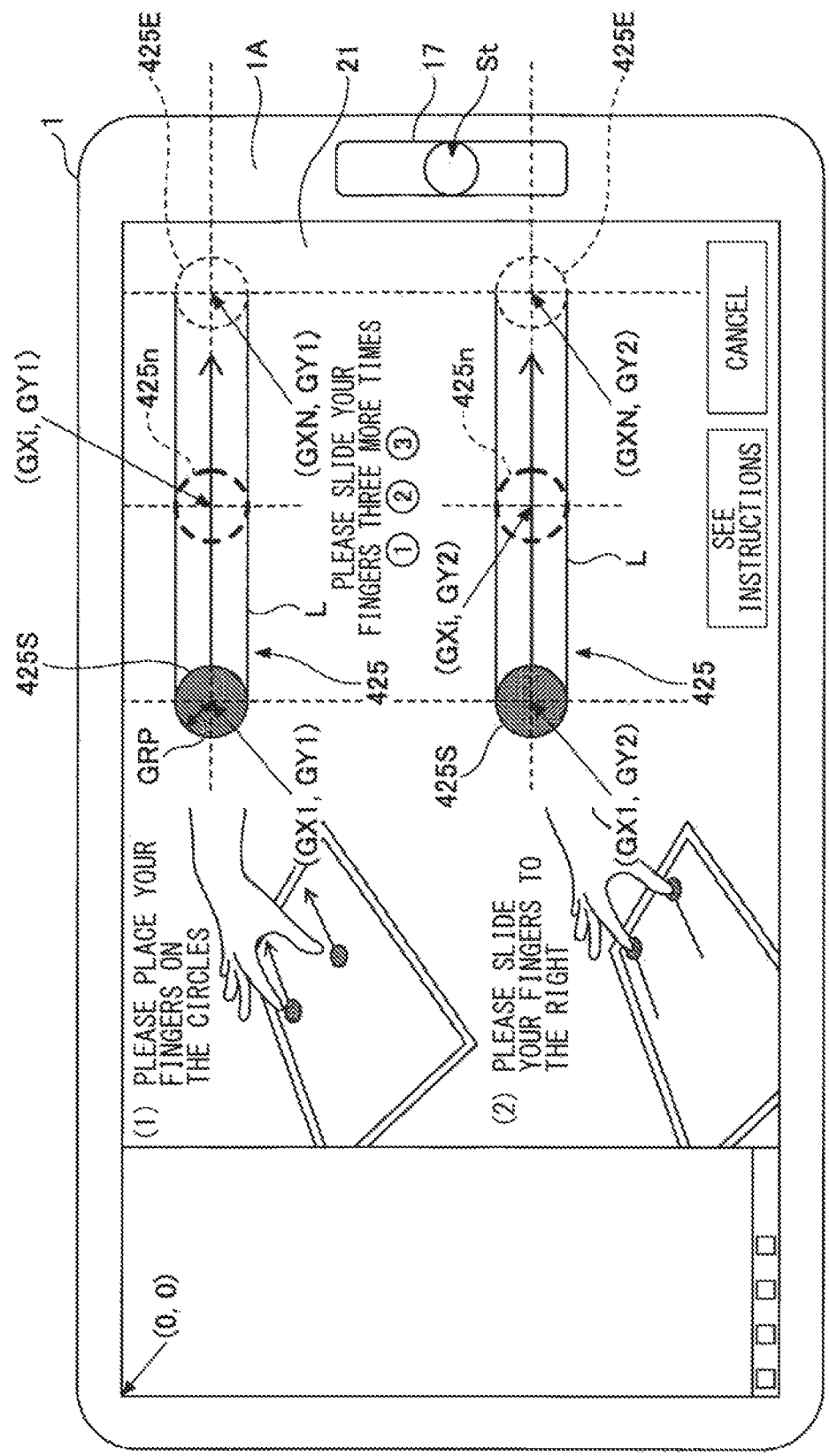
FIG. 8 is a diagram illustrating an example of a guide button arrangement according to one embodiment.

In the terminal device 1 in FIG. 8, the upper guide line Y coordinate GY1 indicating the Y coordinate of the upper touch area 425 with respect to the reference point St, the lower guide line Y coordinate GY2 indicating the Y coordinate of the lower touch area 425 with respect to the reference point St, and the diameter GRP of the guide buttons are shown.

There is an array of guide position update points located at equidistant intervals between the upper and lower starting positions and end positions. Additionally, the first position in the array (i=1) represents the starting position and the last position (i=N) represents the end position. FIG. 8 shows the update point X array positions (1) GX1, the update point X array positions (i) GXi and the update point X array positions (N) GXN that are arrayed on the X axes of the guide buttons.

As one example of the guide buttons, starting guide buttons 425S, end guide buttons 425E and guide buttons 425n having the radius GRP are shown. As mentioned above, the guide position information table 39 stores preset positions at which touch areas 425 for guiding the biometric information reading operation could be displayed.

A display control program 40 is installed in the storage unit 31. The display control program 40 is a program for making the CPU 11 implement guide display control. The OS 15a loads the display control program 40 in the memory 14, activates an application for display control, and controls the guide displays.

The computation unit 32 computes the interval ΔD between update points for display of the guide buttons 425n, and saves the interval ΔD in the update interval storage table 38 in the storage unit 31. The update point interval ΔD is precomputed before the guide display control is started by the application for display control, and saved in the update interval storage table 38. For example, it may be computed before the terminal device 1 is shipped from the factory, or may be computed immediately before the application for display control is activated. Additionally, the update point interval ΔD may be recomputed and the update interval storage table 38 overwritten by the application when the refresh rate or frame rate changes. In this case, when the application is activated, the application may determine whether or not the refresh rate or frame rate has changed before an authentication process in the terminal device 1, and if there has been a change, it may recompute the update point interval ΔD and update the update interval storage table 38 with the new update point interval ΔD.

In the present embodiment, the update point interval ΔD is computed beforehand and an update point array is predetermined. The update point interval ΔD is precomputed on the basis of the number of authentication images to be acquired by the camera 17, the frame rate of the camera 17, the distance from the starting point to the end point of a guide display, and the refresh rate of the internal display 21. The update interval storage table 38 in which the computed update point interval ΔD is saved may, for example, be implemented by means of a storage device such as the HDD 15.

The acquisition unit 33 acquires the update point interval ΔD stored in the update interval storage table 38. The display unit 35 prepares the guide display based on the update point interval ΔD. Additionally, the acquisition unit 33 detects finger touch positions at which the reading operation is to be performed in accordance with the guide display.

The position determination unit 34 determines the positions of the touch areas that are to be presented next in the guide displays of the touch areas indicating a biometric information reading operation when obtaining authentication images in which biometric information is captured. The position determination unit 34 determines the positions of the touch areas to be presented next on the basis of the refresh rate of the display providing the guide display, the number of authentication images to be acquired, and the distance over which the guide displays are to be updated. The distance over which the guide displays are to be updated is the distance between the touch starting position points and the end position points of the guide displays.

The position determination unit 34 may also determine the positions of the touch areas to be presented next on the basis of the response time of the reading operation in response to the touch area display in addition to the computational factors including the refresh rate of the display providing the guide display, the number of authentication images to be acquired, and the distance over which the guide displays are to be updated. The response time of the reading operation in response to the touch area display should preferably be within 0.1 seconds. However, the response time of the reading operation in response to the touch area display may be within 0.2 seconds. In this case, the reading operation refers to the touch-and-slide movement of the user's fingers in accordance with the guide displays.

When a detected reading operation touch position exceeds an acceptable range for a determined position of the touch area to be presented next, the position determination unit 34 may redetermine the position of the touch area to be presented next so as to be a position obtained by adding a predetermined distance to the determined position of the touch area to be presented next. The display unit 35 presents the guide button 425n, as a display of the touch area, at the determined position of the touch area to be presented next.

The computation unit 32, the acquisition unit 33 and the position determination unit 34 may be implemented by means of processes that the display control program 40 makes the CPU 11 execute. The display unit 35 may, for example, be implemented by means of an internal display 21.

FIG. 6 depicts a block diagram focusing on the functions, and a processor for running software for the respective units indicated by these functional blocks is hardware. Additionally, the storage unit 31 may form a database that can be connected to the terminal device 1 or to a memory region inside the terminal device 1 via a network.

Biometric Authentication Device

An example of the functional structure of a biometric authentication device 41 according to the present embodiment installed in the terminal device 1 according to the present embodiment will be explained with reference to FIG. 9. The biometric authentication device 41 according to the present embodiment has a biometric imaging unit 42, a feature extraction unit 43, an authentication unit 44 and a storage unit 45.

The biometric imaging unit 42 captures images containing user biometric information. The biometric imaging unit 42 may be implemented, for example, by means of a camera 17. The feature extraction unit 43 extracts feature information from the user biometric information images captured by the biometric imaging unit 42. The authentication unit 44 performs biometric authentication of the user by means of the extracted feature information.

In the biometric authentication process executed by the biometric authentication device 41, the authentication unit 44 compares and collates feature information that has been pre-registered in the storage unit 45 with the feature information extracted by the feature extraction unit 43 from the user biometric information captured by the biometric imaging unit 42 during personal verification. The authentication unit 44 determines whether or not the comparison/collation results indicate a match to within a predetermined threshold value range, and outputs a personal verification result. If the comparison/collation results indicate a match, then the authentication unit 44 determines that biometric authentication has succeeded and outputs a personal verification result indicating that the user is genuine.

The pre-registered feature information is sometimes called, for example, a registration template 46. In the registration process for the registration template, as in the case of the above-mentioned biometric authentication process, the feature extraction unit 43 extracts feature information from the user biometric information images captured by the biometric imaging unit 42. Furthermore, the registration template is registered by supplying the storage unit 45 with feature information extracted in this manner. The registration template registered in the storage unit 45 may be feature information that has been processed.

Figure 9:
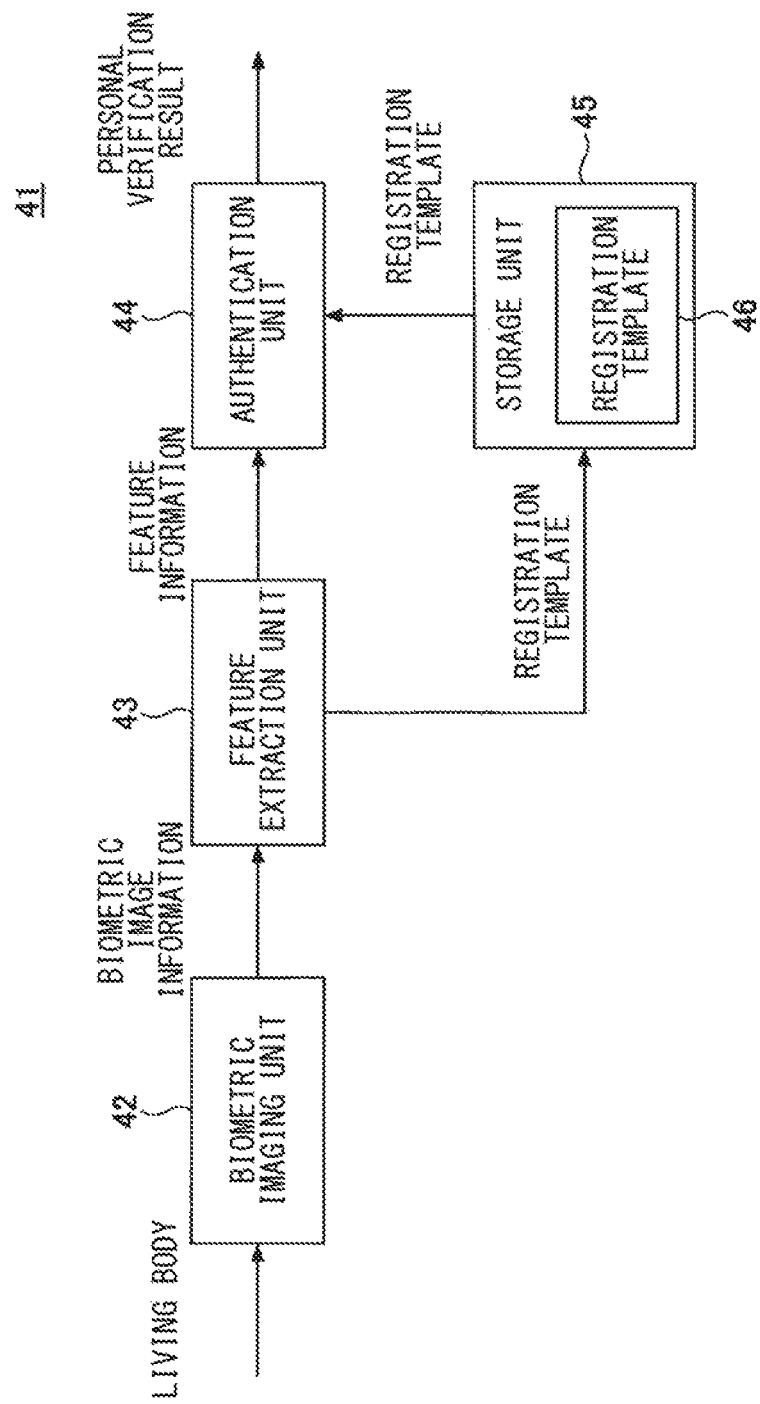
FIG. 9 is a diagram illustrating an example of the functional structure of a biometric authentication device according to one embodiment.

In the example in FIG. 9, the storage unit 45 is provided inside the biometric authentication device 41, but it may be contained in a storage unit outside the biometric authentication device 41. For example, an HDD (Hard Disk Drive), a flash memory or the like, which are examples of the storage unit 45, may be externally connected to the biometric authentication device 41 via an interface such as a USB (Universal Serial Bus). Additionally, the storage unit 45 may form a database that can be connected to the biometric authentication device 41 via a network.

In the present embodiment, the functions of the feature extraction unit 43 and the authentication unit 44 in the biometric authentication device 41 are executed by a program. The above-mentioned authentication process is implemented in the terminal device 1 by running said program, which is installed in the terminal device 1, by means of the CPU 11.

Other Examples of Guide Displays

Figure 10:
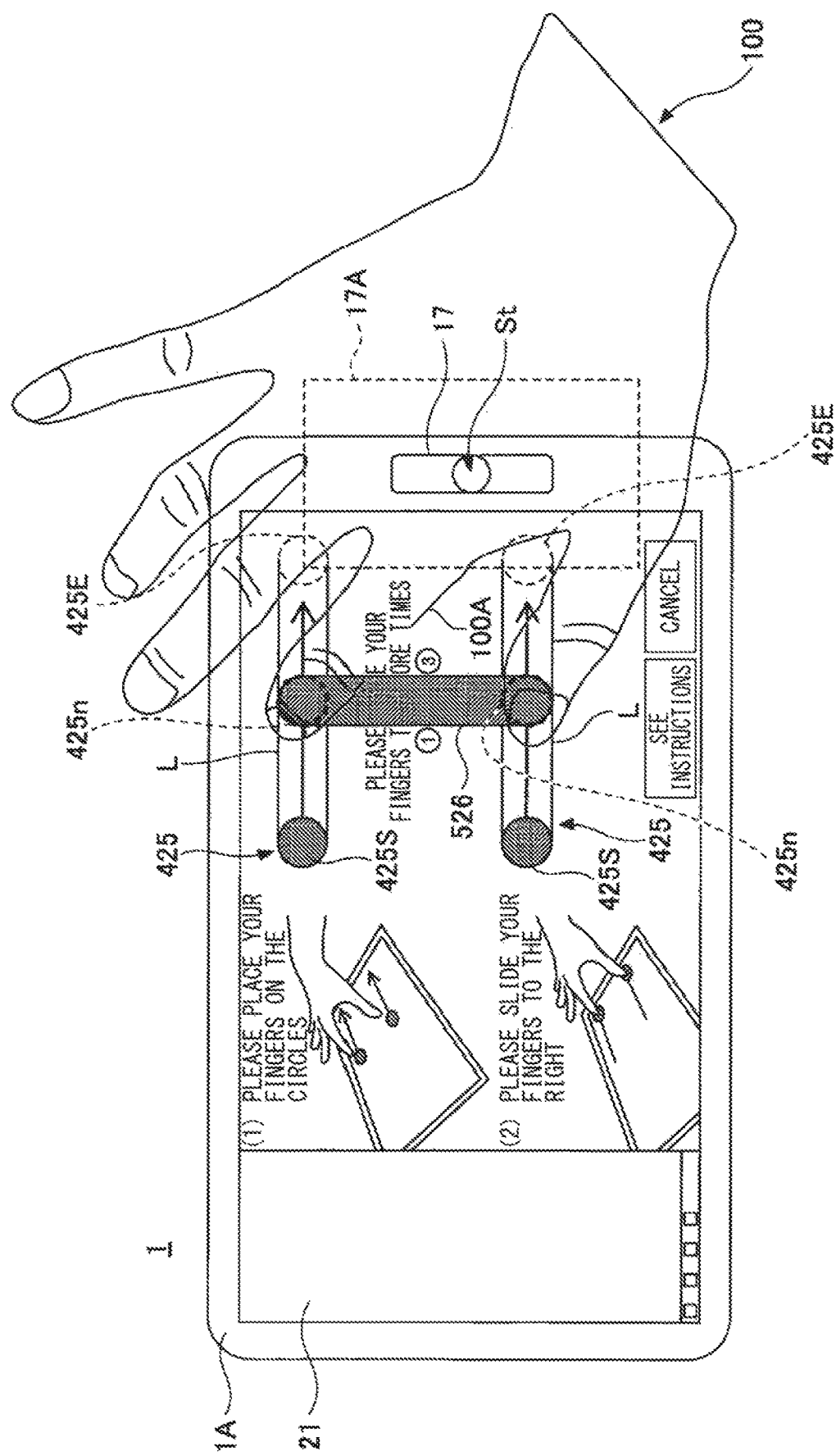
FIG. 10 is a diagram for explaining a reading operation using a guidance screen according to one embodiment.

FIG. 10 illustrates another example of a guide display according to one embodiment. As in the example illustrated in FIG. 10, it is possible to present a single operation indicator 526 as a common guide for multiple touch areas 425. The single operation indicator 526 is in the shape of a bar. In this case also, when the fingers arrive at the guide position update points, the display positions of the guide buttons 425n are updated so as to be ahead of the fingers in the advancement direction thereof.

The user 100 performs a touch operation while observing the guide buttons 425n. According to the display of the guidance screen illustrated in FIG. 10, it is possible to show the operation indicator 526 in the form of a bar that can be seen between the fingers of the user 100, thereby facilitating finger touch operations following the guide buttons 425n. The shape and the display format of the operation indicator 526 joining the two guide buttons 425n into one are not particularly limited.

It is possible to arrange the touch areas 425 illustrated in FIGS. 2 and 10 such that, for example, the guide display of a touch area 425 is updated each time one of the fingers used by the user 100 to perform the operation passes n (n=2, 3, . . . , x−1) points in the array on a guide line L, as long as a touch operation has been performed with respect to one of the guide buttons 425n, even if a touch operation is not performed on the other guide button 425n. In this case, it is possible to reduce the amount of computation compared with the case in which the guide buttons 425n are updated so as to guide the next touch in accordance with operations to the two guide buttons 425n respectively. Additionally, it is possible to present only one guide button 425n on the guidance screen.

However, when the time at which imaging by the camera 17 is to be started is determined on the basis of only the operation of a single guide line L, there is a possibility that states in which the hand orientation is not stable will be permitted. For this reason, it is preferable for multiple touch areas 425 to be presented on the guidance screen, and in particular, the determination of when to start imaging by the camera 17 is preferably made on the condition that touch operations are simultaneously performed with respect to multiple guide lines L.

Figure 11:
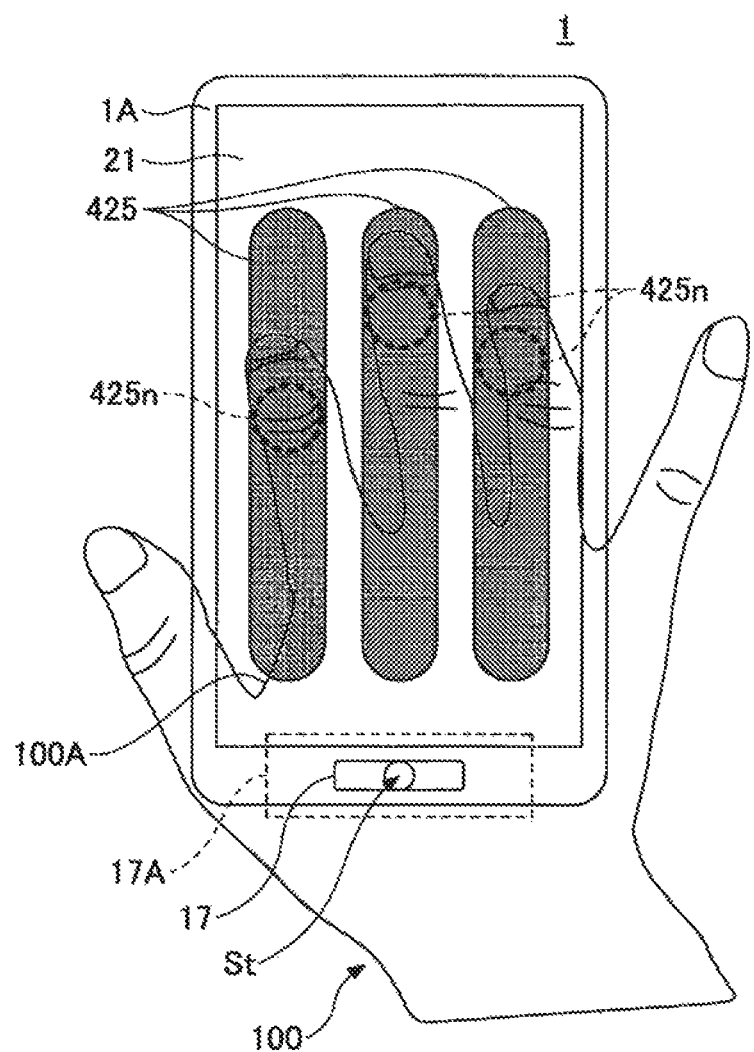
FIG. 11 is a diagram for explaining a reading operation using a guidance screen according to one embodiment.

As illustrated in FIG. 11, it is possible to present three touch areas 425 vertically on a terminal device 1 that is arranged so as to be longer in the vertical direction. In this case, the user 100 simultaneously swipes the three touch areas 425 with the tips of the fingers (in this example, the index finger, the middle finger and the ring finger), and during that time, the camera 17 images the palm 100A within the imaging range 17A. In this case also, when the fingers arrive at the guide position update points, the display positions of the guide buttons 425n are updated so as to be ahead of the finger in the advancement direction thereof.

Update Point Interval Computation Method

Next, an example of the computation method for the update point interval $\Delta D$ will be explained. As illustrated in FIG. 4, the update point interval $\Delta D$ is the interval between points at which the guide button 425n is presented, provided at equidistant intervals between the starting guide button 425S and the end guide button 425E. The update point interval $\Delta D$ is computed on the basis of the conditions (1)-(4):

(1) the minimum number of images that are necessary for authentication (fixed value);
(2) the frame rate of the camera (number of images captured per unit time) (fixed value);
(3) the distance between the touch starting position and the touch end position (fixed value assuming a normal palm size); and
(4) the refresh rate (fixed value or variable value determined by settings in the internal display 21).

The computation unit 32 uses conditions (1), (2) and (3) to compute the maximum palm movement speed. Since the conditions (1), (2) and (3) are all fixed values, the maximum palm movement speed that is computed will also be a fixed value.

The computation unit 32 uses the computed maximum palm movement speed to compute the speed by which sliding is guided by the guide buttons 425n (hereinafter referred to as "slide-guiding speed").

The computation unit 32 computes the update point interval $\Delta D$ on the basis of the distance between the touch starting position and the touch end position, the slide-guiding speed and the refresh rate so that the guide display update frequency does not exceed the refresh rate.

Thus, in the terminal device 1 according to the present embodiment, the update point interval $\Delta D$ is precomputed on the basis of the number of authentication images to be acquired, the frame rate of the camera 17, the distance between the touch starting point and the touch end point, and the refresh rate of the internal display 21, and is saved in the update interval storage table 38. As a result thereof, the update point interval $\Delta D$ can be determined so that the update frequency does not exceed the refresh rate.

As illustrated in FIG. 4, the guide position update points are prepared, on the basis of the computed update point interval ΔD, so as to lie at equidistant intervals ΔD between the touch starting position and the touch end position. When a finger arrives at a guide position update point, the guide position (i.e., the display position of the guide button 425*n*) is updated so as to be ahead of the finger in the advancement direction thereof.

When the guide display update frequency exceeds the refresh rate, a great load is applied to the terminal device 1. In that case, the processing to be performed by the CPU 11 can sometimes not keep up with the timing by which the screen is updated according to the refresh rate, and this can cause the screen to flicker. Additionally, the image capture timing of the camera 17 in response to instructions from the OS 15*a* can be delayed, and the acquisition of captured palm image data can missed by the CPU 11, so the time required for acquiring the captured images necessary for authentication does not become any shorter.

Defining the refresh rate screen update interval time as T and the guide display update frequency cycle time as S, the guide display update processing time is made sufficiently short. Under these conditions, screen flicker can be prevented when the condition, refresh rate screen update interval time T<guide display update frequency cycle time S.

The guide display update frequency cycle time S is adjusted by adjusting the computed update point interval ΔD. Therefore, in the present embodiment, the update point interval ΔD is precomputed so as to satisfy the condition, refresh rate screen update interval time T<guide display update frequency cycle time S, and stored in the storage unit 31. During the guide display, guide position update points are prepared with the computed update point intervals ΔD, and the guide displays are updated. Due thereto, situations in which the guide displays are updated more frequently than the refresh rate are prevented. As a result thereof, screen flicker is prevented and it is possible to capture images that can be authenticated in a shorter time.

The specific computation method for the update point interval ΔD is indicated below. First, the acceptable range for the slide-guiding speed is determined. The determination is made by using the computational elements indicated below.

Computational Elements for Speed Control

The distance D from the touch starting position to the touch end position is set to be 10 cm based on the size of the palm of the hand.

The time (minimum) Tmin from the start of a touch to the end of the touch is set to be 0.5 seconds.

The time necessary for acquiring the minimum number of images from which biometric information can be formed, assuming that the minimum number of images necessary for authentication is eleven and that the frame rate (FPS) of the camera is 30 (per second), is 0.5 seconds (allowing 15 images to be captured).

The time (maximum) (Tmax) from the start of a touch to the end of the touch is set to be 5 seconds in consideration of the power consumption of the camera 17 and the power consumption of an LED mounted near the camera 17.

Speed Computation

The acceptable range for the slide-guiding speed is computed as indicated below.

Maximum speed $V\text{max}=D/T\text{min}=10/0.5=20$ cm/s

Minimum speed $V\text{min}=D/T\text{max}=10/5=2$ cm/s

Next, the slide-guiding speed Vtyp is chosen from between Vmax (=20 cm/s) and Vmin (2 cm/s) which is the acceptable range of the slide-guiding speed. In the present embodiment, the assumed processing time Ttyp necessary for the guide display update process is 1 s, and the slide-guiding speed Vtyp is set to be 10 cm/s.

Next, the acceptable values (lower limit value and upper limit value) of the update point interval ΔD satisfying the below-indicated conditions are computed. In the present embodiment, as indicated below, three conditions are set by considering condition (a) relating to the refresh rate, and in addition thereto, condition (b) relating to the camera frame rate and condition (c) relating to the software response time in response to user operation. The software response time in response to user operation refers to the guide display response time for reading operations (touch-and-slide movements on the guide display) by the fingers.

(a) The update point update time (interval ΔD) must not be shorter than the refresh rate (RFR, 60 Hz in the present embodiment).

$\Delta D >= V\text{typ}/RFR=10/60=0.16$ cm (b) The update point update time (interval ΔD) must not be shorter than the frame rate (FPS, 30 fps in the present embodiment).

$\Delta D >= V\text{typ}/\text{FPS}=10/30=0.33$ cm (c) The update point update time (interval ΔD) must not be longer than the software response time (Tuser, 0.1 second in the present embodiment).

$\Delta D <= V\text{typ} \times T\text{user}=10 \times 0.1=1.0$ cm

Regarding condition (b), if the update point update time is shorter than the frame rate, then a guide update process occurs between each camera image capture, and the load on the system can cause the image capture to fail. Additionally, regarding condition (c), in page 156 of "Designing with the Mind in Mind, Second Edition" by Johnson, J., Feb. 10, 2014, it is mentioned that the sense of a causal relationship becomes tenuous when there is at least a 0.1 second delay in the software response to a user operation.

However, instead of condition (c), it is possible to set a time of 0.2 seconds, which is the time until a prompt is reflected in a hand operation by a human on the basis of visual information. Nonetheless, it is preferable to use the 0.1 seconds in condition (c), due to which the guide displays appear to slide smoothly.

The update point update interval ΔD is determined from among the acceptable values for the update point interval explained above. In the present embodiment, the value ΔD=1.0 cm is chosen in order to reliably capture images.

The guide displays according to the present embodiment can be applied to authentication systems based on the palm such as handprint authentication, or to other types of biometric authentication, and the abovementioned numerical values may each be changed within a range not departing from the spirit of the present invention. Additionally, in the present embodiment, the update point interval ΔD is computed beforehand, but the invention is not limited thereto. For example, the application may set the finger sliding speed of the user during a previous authentication to be the slide-guiding speed Vtyp for the next authentication.

Additionally, the slide-guiding speed Vtyp may be made variable, such as by slowing the slide-guiding speed Vtyp based on the system load conditions. For example, if the system load is high, then the slide-guiding speed Vtyp can be made slower. As a result thereof, the palm can be reliably imaged by the camera 17. The application may compute the optimal update point interval ΔD at the time of each guide display.

Guide Display Control Process

Next, one example of the guide display control process according to the present embodiment will be explained with reference to FIG. 12. When the present process is started, the acquisition unit 33 acquires the coordinates of a guide display from the guide position information table 39 (step S10). From the acquired coordinates, the display unit 35 draws a starting point (touch starting position), an end point (touch end position), and a line connecting the starting point and the end point for the slide operation of each finger (step S12). While the coordinates of the update points that have been read are arranged at equidistant intervals on the X axis, the intervals are ΔD as determined by the aforementioned computational expressions.

Thereafter, the acquisition unit 33 determines whether or not a finger touch event (touch operation) has been reported by the OS 15a (step S14), and repeats step S14 until a report is received. When notified of a finger touch event, the acquisition unit 33 uses a guide display application that operates on the OS 15a to acquire a finger touch coordinate array (FXj, FYj) (j=1, 2, . . . , M) (step S16).

Next, the acquisition unit 33 acquires an array position number n (N≥n≥1) of an activated update point (step S18). In the present embodiment, the value of the X coordinate is the same for the upper and lower activated point arrays, and the same array position number is activated. When n=1, the update point touch starting position is indicated, and when n=N, the update point touch end position is indicated.

Next, a guide update determination process is performed. The position determination unit 34 determines the value of the variable n (step S20), and if it is determined that the variable n is equal to 1, the position determination unit 34 determines that the update point touch starting position has been activated, and update process 1 is performed (step S22). Additionally, if it is determined that the variable n is smaller than N and larger than 1, the position determination unit 34 determines that an update point between the starting position and the end position is activated, and update process 2 is performed (step S24). Additionally, when it is determined that the variable n is equal to N, the position determination unit 34 determines that the update point touch end position is activated, and update process 3 is performed (step S26).

After steps S22 to S26 are performed, step S28 is performed. Hereinbelow, update process 1 in step S22 (FIG. 13), update process 2 in step S24 (FIG. 15) and update process 3 in step S26 (FIG. 19) will be explained sequentially in detail.

Update Process 1

Figure 13:
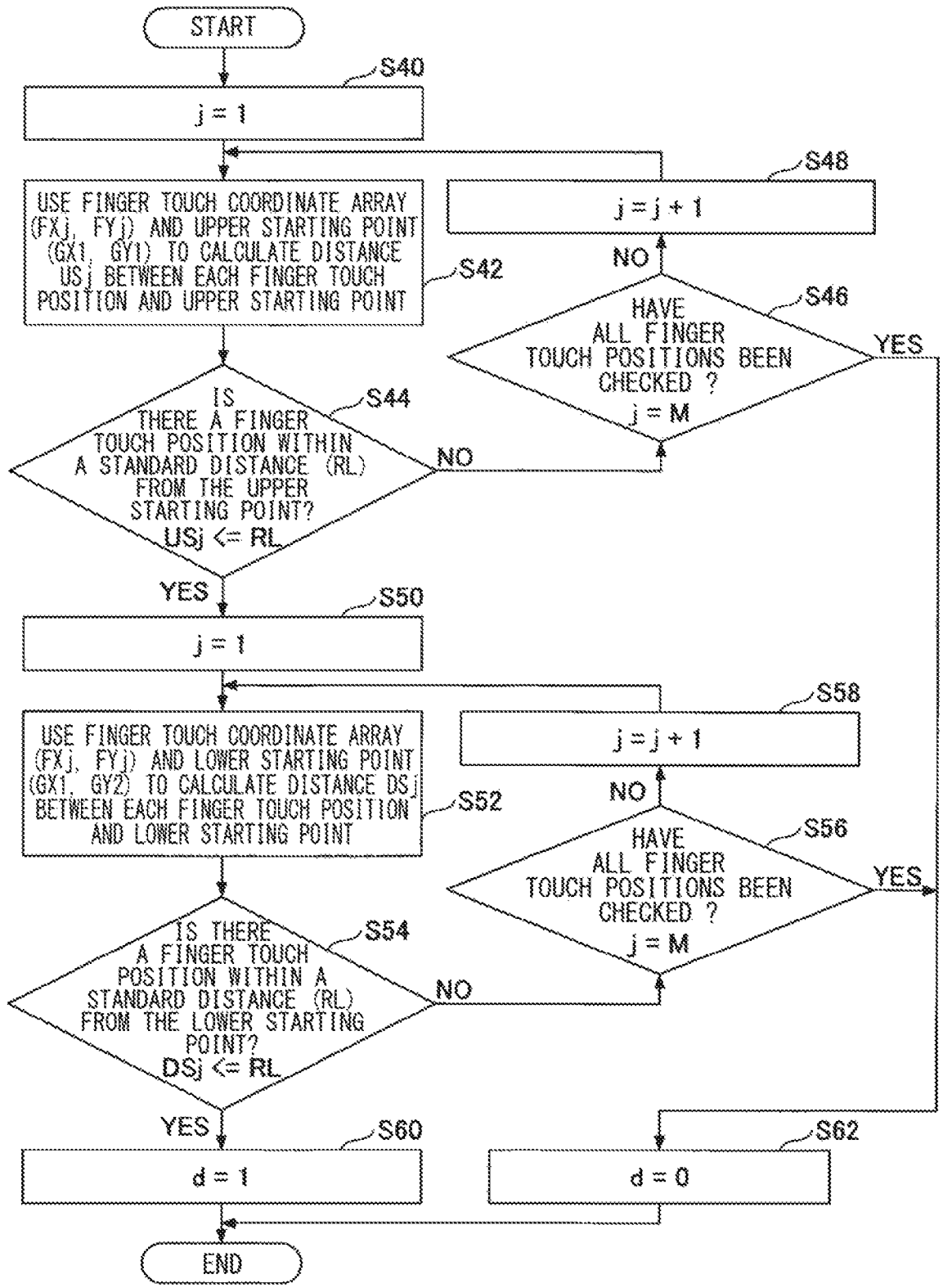
FIG. 13 is a flow chart showing an example of update process 1 according to one embodiment.

When there is an activated update point at the touch starting position, a guide update process is performed in accordance with update process 1 in FIG. 13. The position determination unit 34 computes the distance between the upper and lower touch starting positions and each finger touch position. Furthermore, if it is determined that there is a finger touch position within a standard distance RL from the upper and lower touch starting positions, then the position determination unit 34 performs a guide update process and the next update point, adjacent thereto, is activated.

Specifically, when update process 1 is started, the position determination unit 34 sets the variable j to 1 (step S40). Next, the position determination unit 34 uses the finger touch coordinate array (FXj, FYj) and the upper touch starting position (GX1, GY1) to calculate the distance USj between each finger touch position and the upper touch starting position (step S42).

Figure 14:
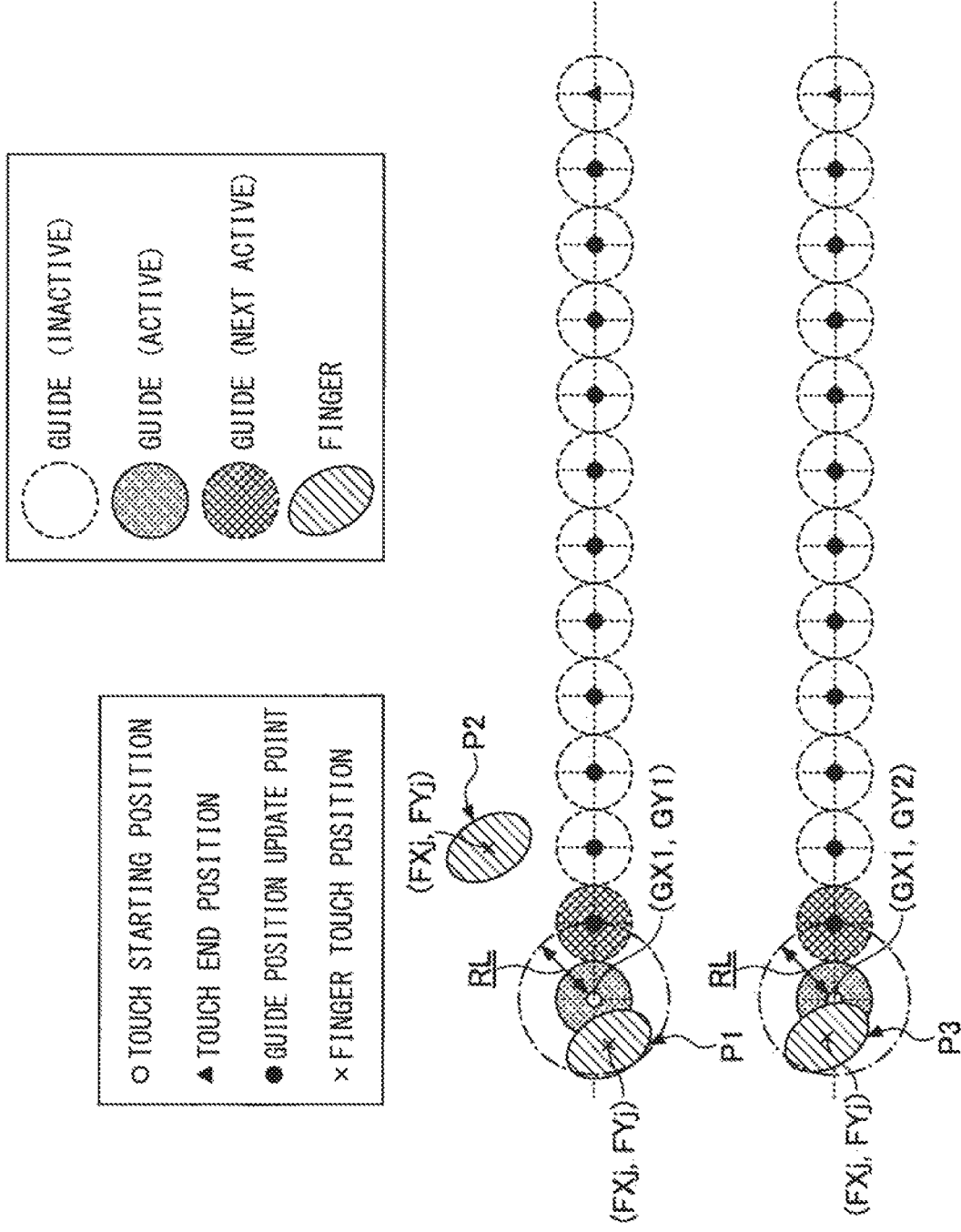
FIG. 14 is a diagram illustrating an example in which guide updating conditions are established in update process 1 according to one embodiment.

Next, the position determination unit 34 determines whether or not there is a finger touch position within a standard distance RL from the upper touch starting position (step S44). As shown in FIG. 14, RL is set to a length equal to the interval ΔD between adjacent update points. For example, if there is a finger at the position P2 in FIG. 14, the distance USj>RL, so the position determination unit 34 determines that there is no finger touch position within the standard distance RL from the upper touch starting position, and the procedure advances to step S46, in which it is determined whether or not all of the finger touch positions have been checked. At this time, if the variable j=M, then it is determined that all of the finger touch positions have been checked. M corresponds to the number of fingers that are touching the screen. For this reason, a value of 1 or greater is chosen for M regardless of the number of guide displays.

If the variable j≠M, then the variable j is incremented by "1" (step S48), the procedure returns to step S42, and steps S42 and S44 are performed. In step S44, for example, when there is a finger at the position P1 in FIG. 14, the distance USj≤RL, so the position determination unit 34 determines, in step S44, that there is a finger touching within the standard distance RL from the upper touch starting position, and the procedure advances to step S50. If all of the finger touch positions are not within the standard distance RL from the upper touch starting position (i.e., if j=M), then the procedure advances from step S46 to step S62, and after the variable d is set to "0" (step S62), the present process ends. When the variable d is "0", this indicates that the guide display does not need to be updated.

If it is determined, in step S44, that any of the finger touch positions lie within the standard distance RL from the upper touch starting position, then the position determination unit 34 sets the variable j to be 1 (step S50). Next, the position determination unit 34 uses the finger touch coordinate array (FXj, FYj) and the lower touch starting position (GX1, GY2) to calculate the distances DSj between each of the finger touch positions and the lower touch starting position (step S52).

Next, the position determination unit 34 determines whether or not there is a finger touch position within a standard distance RL from the lower touch starting position (step S54). If the distance DSj>RL, then the position determination unit 34 determines that there are no finger touch positions within the standard distance RL from the lower touch starting position, and it is determined whether or not all of the finger touch positions have been checked (step S56). If the variable j=M, then it is determined that all of the finger touch positions have been checked, the variable d is set to "0" (step S62), and the present process ends. If the variable j≠M, then the variable j is incremented by "1" (step S58), the procedure returns to step S52, and steps S52 and S54 are performed.

If there is a finger at the position P3 in FIG. 14, the distance DSj<RL, so the position determination unit 34 determines, in step S54, that there is a finger touch position within the standard distance RL from the lower touch starting position, the variable d is set to "1" (step S60), and the present process ends.

Update Process 2

Figure 15:
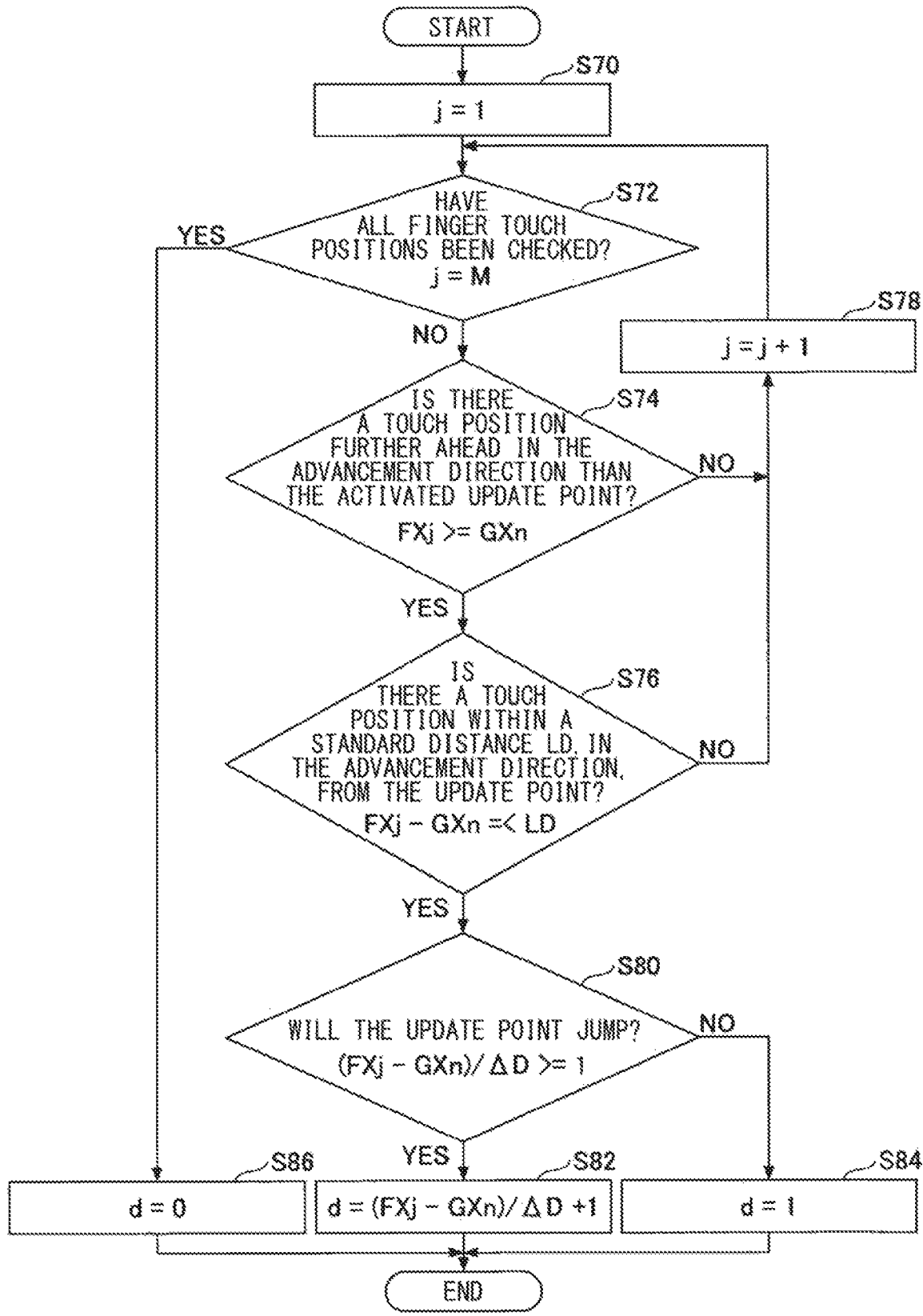
FIG. 15 is a flow chart showing an example of update process 2 according to one embodiment.

When it is determined that an update point has been activated between the starting position and the end position, a guide update process is performed in accordance with update process 2 in FIG. 15. Update process 2 is performed if, in one or both of the upper and lower guide lines, a finger touch position lies ahead of the activated update point in the advancement direction, and is within a certain distance, in X coordinates, relative to the activated update point. As a result thereof, an adjacent update point lying further ahead in the advancement direction than the finger touch position is activated. The reason for the condition of being within a certain distance is in order to prevent the guide update process from being executed when a different finger touches the screen in the advancement direction.

When update process 2 is started, the position determination unit 34 sets the variable j to 1 (step S70) and determines whether all of the finger touch positions have been checked (step S72). If the variable j=M in step S72, then it is determined that all of the finger touch positions have been checked, and after the variable d is set to "0" (step S86), the present process ends. When the variable d is "0", this indicates that the guide display does not need to be updated.

On the other hand, if the variable j≠M in step S72, then it is determined that not all of the finger touch positions have been checked, and the position determination unit 34 determines whether or not there is a touch position lying further ahead, in the advancement direction, than the activated update point (step S74).

In step S74, if FXj<GXn, then it is determined that there are no touch positions lying further ahead, in the advancement direction, than the activated update point, and the procedure advances to step S78. For example, if the finger lies at the position P6 in FIG. 16, then the finger's X-axis position FXj and the activated update point GXn have the relationship FXj<GXn. In this case, the procedure advances to S78.

On the other hand, for example, if the finger lies at the position P4 in FIG. 16, then the finger's X-axis position FXj and the activated update point GXn have the relationship FXj≥GXn. In this case, it is determined that there is a touch position lying further ahead, in the advancement direction, than the activated update point, and the position determination unit 34 determines whether or not there is a touch position within a certain distance LD, in the advancement direction, from the activated update point (step S76).

If the finger lies at the position P5 in FIG. 16, then FXj−GXn>LD. Therefore, the procedure advances to step S78, the position determination unit 34 increments the variable j by "1", the procedure returns to step S72, and the process is performed from step S72.

On the other hand, for example, if the finger lies at the position P4 in FIG. 16, the position P7 in FIG. 17 or the position P8 in FIG. 18, then FXj−GXn≤LD in step S76. For this reason, the position determination unit 34 determines whether the update point will jump (step S80). If (FXj−GXn)/ΔD≥1 is true, then it is determined that the update point will jump.

If the finger lies at the position P4 in FIG. 16 or the position P7 in FIG. 17, then (FXj−GXn)/ΔD≥1 is not true. Thus, the position determination unit 34 sets d to "1" (step S84), and the present process ends.

On the other hand, if the finger lies at the position P8 in FIG. 18, then (FXj−GXn)/ΔD≥1 is true. Thus, the position determination unit 34 sets d to be (FXj−GXn)/ΔD+1 (step S82), and the present process ends.

As explained above, if the finger overlaps with the activated guide (FIG. 16), or if the finger has passed the activated guide (FIG. 17), then the activated guide is updated on the condition that the finger is touching a location ahead of the activated update point. As a result thereof, the guide button 425n is presented at a newly activated guide. Additionally, as shown in FIG. 18, the update point that is activated next depends on the finger touch position, and the adjacent point in the advancement direction is not always activated next.

In the present embodiment, the X coordinate values of the upper and lower activated update point array positions are the same, and the activated update points have the same array position number. However, the X coordinates of the upper and lower activated update point array positions may be held separately, and the upper and lower activated update point array position numbers may be different.

Update Process 3

Figure 19:
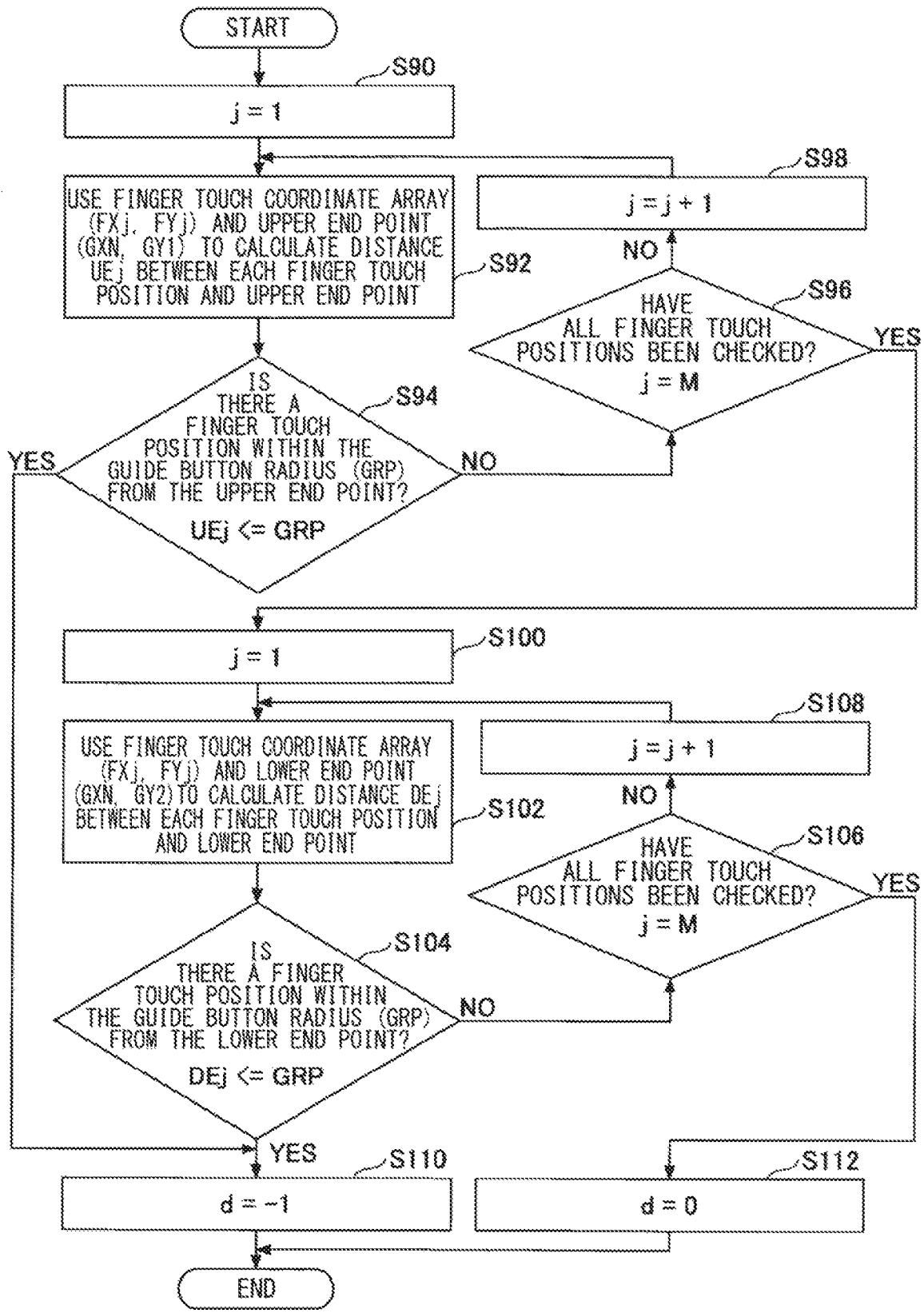
FIG. 19 is a flow chart showing an example of update process 3 according to one embodiment.

When an activated update point lies at the touch end position, the guide update process is performed in accordance with update process 3 in FIG. 19. In update process 3, if the distance to a finger touch position is within the radius GRP of the guide display for one or both of the upper and lower touch end positions, then it is assumed that the terminus has been reached and the guide display process ends.

Figure 20:
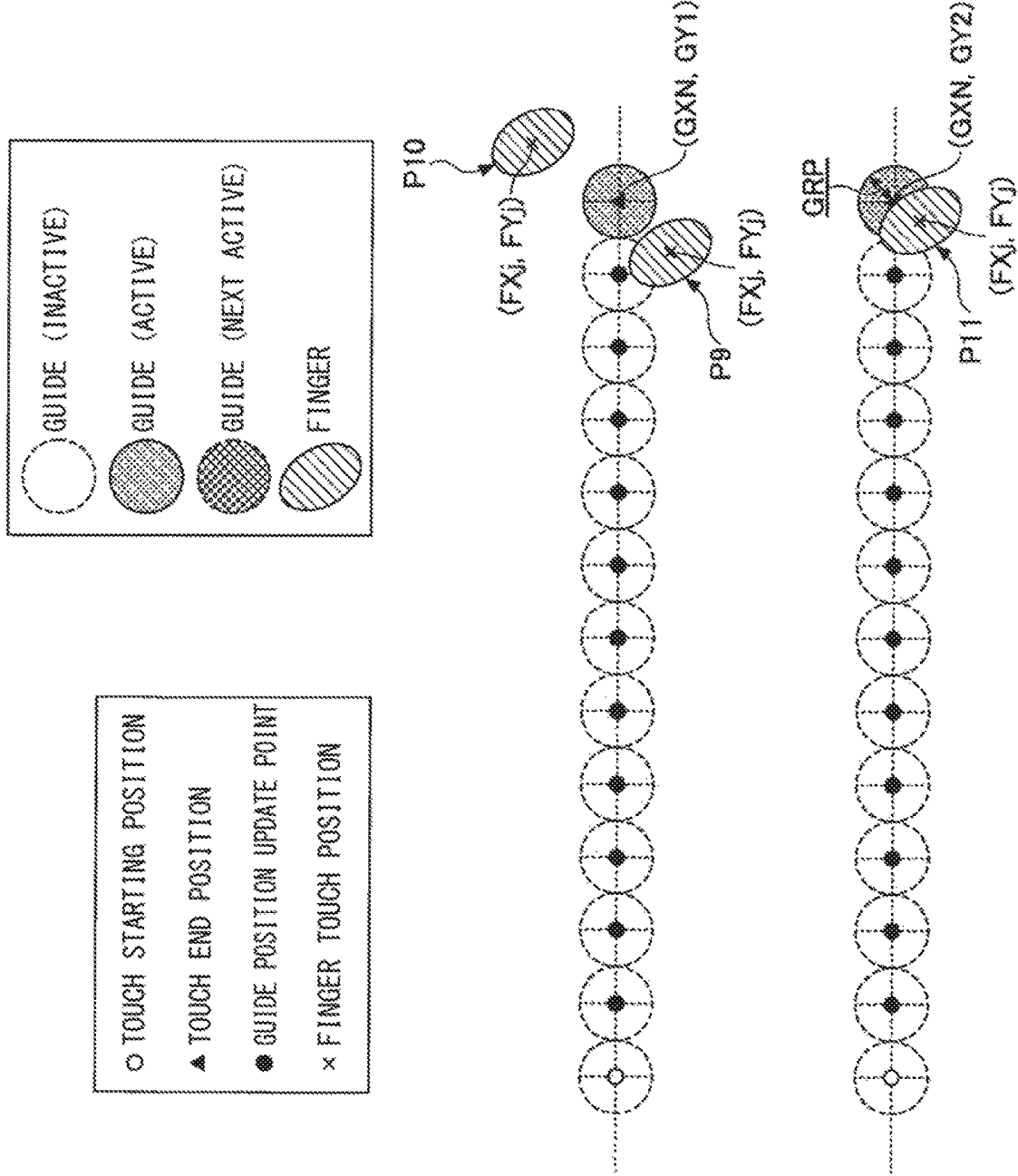
FIG. 20 is a diagram illustrating an example in which end position point arrival conditions are established in update process 3 according to one embodiment.

When update process 3 is started, the position determination unit 34 sets the variable j to 1 (step S90). Next, the position determination unit 34 uses the finger touch coordinate array (FXj, FYj) and the upper touch end position (GXN, GY1) to calculate the distance UEj between each finger touch position and the upper touch end position (step S92). Next, the position determination unit 34 determines whether or not there is a finger touch position within the radius GRP of the end guide button 425E from the upper touch end position (step S94). If there are fingers at the positions P9 and P10 shown in FIG. 20, then the distances UEj>GRP, and the position determination unit 34 determines that there are no finger touch positions within the radius GRP of the end guide button 425E from the upper touch end position. In this case, the position determination unit 34 determines whether or not all of the finger touch positions have been checked (step S96). If the variable j=M, then it is determined that all of the finger touch positions have been checked, and the procedure advances to step S100.

If the variable j≠M, then the variable j is incremented by "1" (step S98), the procedure returns to step S92, and steps S92 and S94 are performed. If the position determination unit 34 determines, in step S94, that there is a finger touch position within the radius GRP of the end guide button 425E from the upper touch end position, then d is set to "−1" (step S110) and the present process ends. When the variable d is "−1", this indicates that the last update point of the guide display has been reached.

In step S100, the position determination unit 34 sets the variable j to "1". Next, the position determination unit 34 uses the finger touch coordinate array (FXj, FYj) and the lower touch end position (GXN, GY2) to calculate the distance DEj between each finger touch position and the lower touch end position (step S102). Next, the position determination unit 34 determines whether or not there is a finger touch position within the radius GRP of the end guide button 425E from the lower touch end position (step S104).

If the distance DEj>GRP, then the position determination unit 34 determines that there are no finger touch positions within the radius GRP of the end guide button 425E from the lower touch end point, and it is determined whether or not all of the finger touch positions have been checked (step S106). If the variable j=M, then it is determined that the touch positions of all of the fingers have been checked, the variable d is set to "0" in step S112, and the present process ends.

If the variable j≠M in step S106, then the variable j is incremented by "1" (step S108), the procedure returns to step S102, and steps S102 and S104 are performed. For example, if there is a finger at the position P11 in FIG. 20, then the distance DEj≤GRP, so the position determination unit 34 determines, in step S104, that the finger touch position lies within the radius GRP of the end guide button 425E from the lower touch end position, and the procedure advances to step S110. The position determination unit 34 sets d to "−1" in step S110, and the present process ends.

Figure 12:
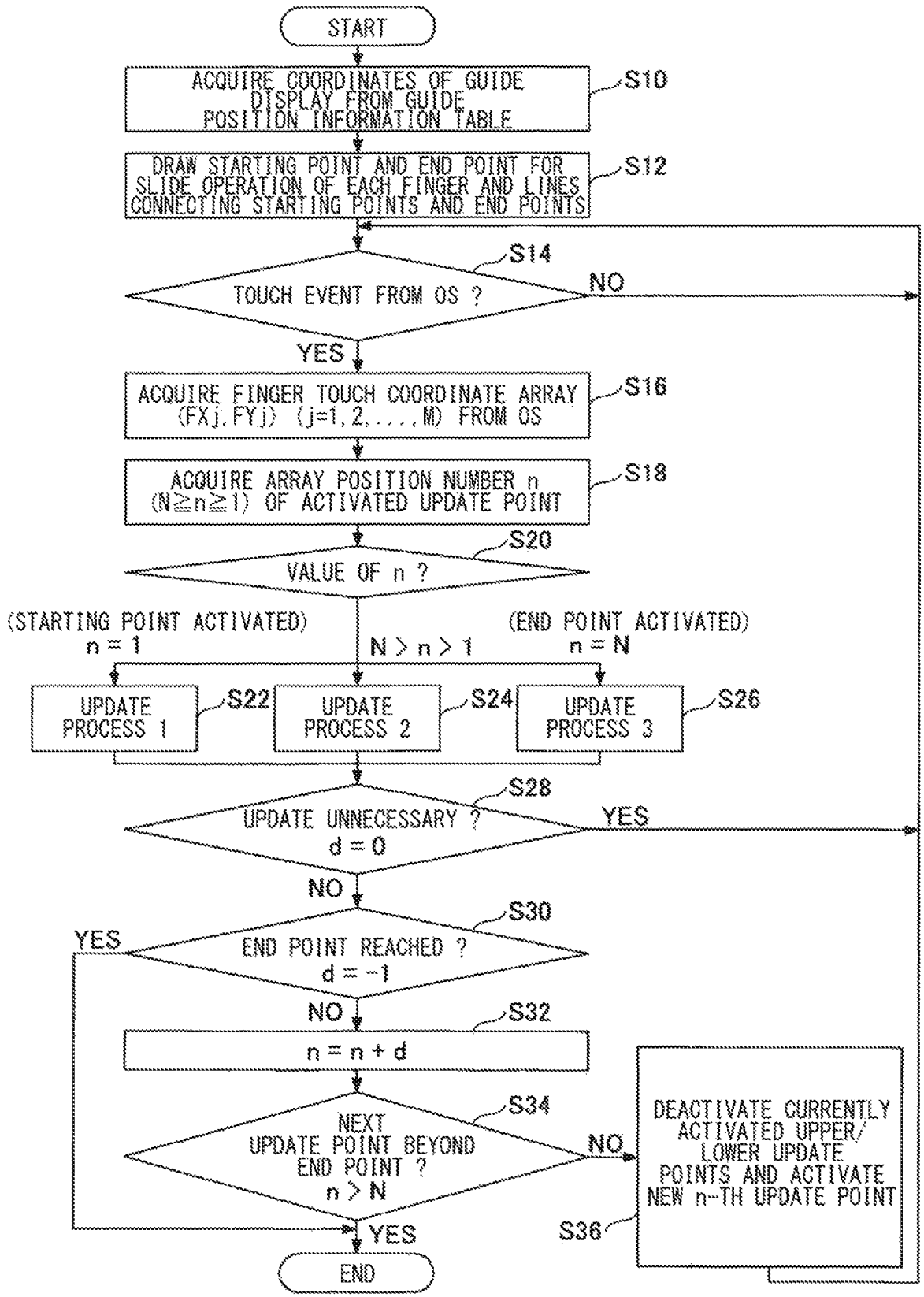
FIG. 12 is a flow chart showing an example of a guide display control process according to one embodiment.

The update processes 1-3 of steps S22 to S26 in FIG. 12 have been explained above. Returning to FIG. 12, after one of the update processes 1 to 3 is performed, the position determination unit 34 determines, in step S28, whether or not the guide display needs to be updated. When the variable d=0, it is determined that the guide display does not need to be updated. In this case, the procedure returns to step S14, the next finger touch event is awaited, and when there is a touch event, the process is repeated from step S16.

On the other hand, if the variable d≠0 in step S28, then it is determined that the guide display needs to be updated. In this case, the position determination unit 34 determines whether or not a finger has arrived at the guide display touch end position (step S30). If the variable d=−1, then it is determined that the finger has reached the guide display touch end position, and the present process ends.

In step S30, when the variable d≠−1, it is determined that the finger has not reached the guide display touch end position, and the position determination unit 34 adds the variable d to the variable n (step S32). Next, the position determination unit 34 determines whether or not the next update point n exceeds the endpoint N indicating the guide display touch end position (step S34). If n>N, then it is determined that the next update point exceeds the guide display touch end position, and the present process ends.

On the other hand, if n≤N, then it is determined that the next update point does not exceed the guide display touch end position. In this case, the position determination unit 34 deactivates the currently activated upper and lower update points, and newly activates n-th update points (step S36). Thereafter, the procedure returns to step S14, and the procedure is repeated from step S16 for the next touch event. If the next point has reached the guide display touch end position (step S30) or exceeds the touch end position (step S34), then the present process ends.

As explained above, in the terminal device 1 according to the present embodiment, if the guide display update time interval is faster than the refresh rate of the display when obtaining authentication images in which biometric information is captured, then the display appears to flicker. For this reason, the guide display update time interval is made slower than the refresh rate. In order to do so, the update point interval ΔD is set so that the image update time interval is slower than the refresh rate of the display.

Guide position update points are prepared at equidistant intervals ΔD between the touch starting position and the touch end position, and when a finger reaches an update point, the guide position is updated so as to be ahead of the finger in the advancement direction thereof. Regarding the update point interval ΔD, an update point interval in which the update frequency does not exceed the refresh rate can be determined from the distance between the touch starting position and the touch end position, the slide-guiding speed and the refresh rate. By employing this update point interval ΔD during guide display, it is possible to present the guides without flicker and with a shorter authentication time.

Additionally, when the update point jumps, an update point at a position obtained by adding a predetermined distance in accordance with the finger touch position is activated and set as the position of the touch area to be presented next. As a result, it is possible to smoothly present guides in accordance with the finger movement speed.

While the terminal device and the display control program have been explained by means of the embodiments described above, the terminal device and display control program according to the present invention is not limited to the above-described embodiments, and various modifications and improvements are possible within the scope of the present invention. Additionally, when there are multiple embodiments and possible modifications, they may be combined within a range not contradicting each other.

For example, in the terminal device 1 according to the present embodiment, the update point interval ΔD was computed so as to make the guide display update time interval slower than the refresh rate. However, the invention is not limited thereto, and the update point interval ΔD may be computed by using the frame rate instead of the refresh rate, so as to make the guide display update time interval slower than the frame rate. In this case, the present invention provides a terminal device in which, when obtaining images in which biometric information for authentication is captured, the next display position of a guide display indicating a touch area that is moved during the biometric information reading operation is determined on the basis of the frame rate of the display providing the guide display, the number of authentication images to be acquired and the distance over which the guide displays are to be updated.

What is claimed is:

1. A terminal device comprising:
a position determination unit that, when obtaining authentication images in which biometric information is captured, determines a position of a touch area to be presented next, in a guide display of touch areas indicating a biometric information reading operation, based on a refresh rate of a display providing the guide display, a number of authentication images to be acquired and a distance over which the guide display is to be updated.

2. The terminal device according to claim 1, comprising:
the display that presents a touch area at the determined position of the touch area to be presented next; wherein
the position determination unit determines the position of the touch area to be presented next in accordance with a guide display response time for the reading operation.

3. The terminal device according to claim 2, wherein:
the guide display response time for the reading operation is 0.2 seconds or less.

4. The terminal device according to claim 1, comprising:
an acquisition unit that acquires a reading operation touch position; wherein
when the acquired reading operation touch position exceeds an acceptable range for the position of the touch area to be presented next, the position determination unit determines the position of the touch area to be presented next as a position obtained by adding a predetermined distance, depending on the acquired reading operation touch position, to the determined position of the touch area to be presented next.

5. A display control method comprising:
when obtaining authentication images in which biometric information is captured, determining a position of a touch area to be presented next, in a guide display of touch areas indicating a biometric information reading operation, based on a refresh rate of a display providing the guide display, a number of authentication images to be acquired and a distance over which the guide display is to be updated.

6. The display control program according to claim 5, comprising:
   presenting a touch area at the determined position of the touch area to be presented next; wherein
   the position of the touch area to be presented next is determined in accordance with a guide display response time for the reading operation.

7. The display control program according to claim 6, wherein:
   the guide display response time for the reading operation is 0.2 seconds or less.

8. The display control program according to claim 5, comprising:
   acquiring a reading operation touch position; wherein if the acquired reading operation touch position exceeds an acceptable range for the position of the touch area to be presented next, the position of the touch area to be presented next is determined as a position obtained by adding a predetermined distance, depending on the acquired reading operation touch position, to the determined position of the touch area to be presented next.

9. A terminal device comprising:
   a position determination unit that, when obtaining images in which biometric information is captured for authentication, determines a next display position of a guide display indicating touch areas that are moved in a biometric information reading operation, based on a frame rate of a display providing the guide display, a number of authentication images to be acquired and a distance over which the guide display is to be updated.

\* \* \* \* \*